United States Patent
Ginetti et al.

(10) Patent No.: US 9,223,915 B1
(45) Date of Patent: Dec. 29, 2015

(54) METHOD, SYSTEM, AND COMPUTER PROGRAM PRODUCT FOR CHECKING, VERIFYING, OR TESTING A MULTI-FABRIC ELECTRONIC DESIGN SPANNING ACROSS MULTIPLE DESIGN FABRICS

(71) Applicant: Cadence Design Systems, Inc., San Jose, CA (US)

(72) Inventors: Arnold Ginetti, Antibes (FR); Vikas Kohli, Noida (IN); Taranjit Singh Kukal, Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/503,406

(22) Filed: Oct. 1, 2014

Related U.S. Application Data

(60) Provisional application No. 62/033,607, filed on Aug. 5, 2014.

(51) Int. Cl.
*G06F 17/50* (2006.01)

(52) U.S. Cl.
CPC ........ *G06F 17/5022* (2013.01); *G06F 2217/04* (2013.01); *G06F 2217/08* (2013.01); *G06F 2217/38* (2013.01); *G06F 2217/40* (2013.01); *G06F 2217/74* (2013.01)

(58) Field of Classification Search
CPC .................................................. G06F 17/5045
USPC ........................................................ 716/102
See application file for complete search history.

(56) References Cited

U.S. PATENT DOCUMENTS

| | | |
|---|---|---|
| 5,396,435 A | 3/1995 | Ginetti |
| 5,426,591 A | 6/1995 | Ginetti et al. |
| 5,633,803 A | 5/1997 | Silve et al. |
| 5,638,290 A | 6/1997 | Ginetti et al. |
| 5,726,902 A | 3/1998 | Mahmood et al. |
| 5,751,596 A | 5/1998 | Ginetti et al. |
| 5,764,525 A | 6/1998 | Mahmood et al. |
| 5,825,658 A | 10/1998 | Ginetti et al. |
| 5,841,663 A | 11/1998 | Sharma et al. |
| 5,896,299 A | 4/1999 | Ginetti et al. |
| 5,956,257 A | 9/1999 | Ginetti et al. |
| 6,086,621 A | 7/2000 | Ginetti et al. |

(Continued)

OTHER PUBLICATIONS

Hon-Chi Ng, "Cpr E 305 Laboratory Tutorial ¾ Verilog Syntax: Summary of Verilog Syntax" Last Updated: Feb. 7, 2001.

(Continued)

*Primary Examiner* — Suresh Memula
(74) *Attorney, Agent, or Firm* — Vista IP Law Group, LLP

(57) ABSTRACT

Disclosed are various techniques that check, verify, or test multi-fabric designs by receiving a request for checking correctness of a multi-fabric design across at least a first design fabric and a second design fabric. A request for action is transmitted from a first EDA tool session to a second EDA tool session. Connectivity information of second design data in the second design fabric is identified by the second EDA tool session in response to the request for action from the first EDA tool session. These various techniques then check the correctness of the multi-fabric design in the first design fabric by using at least the connectivity information of the second design data. A symbolic representation may be used to represent design data in an EDA tool session to which the design data are not native.

20 Claims, 12 Drawing Sheets

(56) References Cited

U.S. PATENT DOCUMENTS

| | | |
|---|---|---|
| 6,113,647 A | 9/2000 | Silve et al. |
| 6,145,117 A | 11/2000 | Eng |
| 6,170,080 B1 | 1/2001 | Ginetti et al. |
| 6,353,612 B1 | 3/2002 | Zhu |
| 6,378,116 B1 | 4/2002 | Ginetti |
| 6,401,128 B1 | 6/2002 | Stai |
| 6,405,345 B1 | 6/2002 | Ginetti |
| 6,519,743 B1 | 2/2003 | Nauts et al. |
| 6,622,290 B1 | 9/2003 | Ginetti et al. |
| 6,622,291 B1 | 9/2003 | Ginetti |
| 7,143,341 B1 | 11/2006 | Kohli |
| 7,168,041 B1 | 1/2007 | Durrill et al. |
| 7,490,309 B1 | 2/2009 | Kukal et al. |
| 7,555,739 B1 | 6/2009 | Ginetti et al. |
| 7,634,743 B1 | 12/2009 | Ginetti |
| 7,949,987 B1 | 5/2011 | Ginetti et al. |
| 7,971,175 B2 | 6/2011 | Ginetti |
| 7,971,178 B2 | 6/2011 | Marwah et al. |
| 7,990,375 B2 | 8/2011 | Kohli et al. |
| 8,046,730 B1 | 10/2011 | Ferguson et al. |
| 8,145,458 B1 | 3/2012 | Kukal et al. |
| 8,255,845 B2 | 8/2012 | Ginetti |
| 8,261,228 B1 | 9/2012 | Gopalakrishnan et al. |
| 8,271,933 B1 | 9/2012 | Kohli et al. |
| 8,281,272 B1 | 10/2012 | Ginetti |
| 8,286,110 B1 | 10/2012 | Kukal et al. |
| 8,316,337 B2 | 11/2012 | Bhattacharya et al. |
| 8,316,342 B1 | 11/2012 | Kukal et al. |
| 8,347,261 B2 | 1/2013 | Ginetti et al. |
| 8,364,656 B2 | 1/2013 | Arora et al. |
| 8,438,524 B1 | 5/2013 | Kohli et al. |
| 8,452,582 B1 | 5/2013 | Al-hawari et al. |
| 8,453,136 B1 | 5/2013 | Hahn et al. |
| 8,479,134 B2 | 7/2013 | Bhattacharya et al. |
| 8,521,483 B1 | 8/2013 | Kukal et al. |
| 8,527,929 B2 | 9/2013 | Bhattacharya et al. |
| 8,527,934 B2 | 9/2013 | Ginetti et al. |
| 8,566,767 B1 | 10/2013 | Kukal et al. |
| 8,594,988 B1 | 11/2013 | Spyrou et al. |
| 8,631,181 B2 | 1/2014 | Feehrer |
| 8,645,894 B1 | 2/2014 | Kukal et al. |
| 8,656,329 B1 | 2/2014 | Kukal et al. |
| 8,719,754 B1 | 5/2014 | Ginetti |
| 8,732,636 B2 | 5/2014 | Ginetti et al. |
| 8,732,651 B1 | 5/2014 | Kukal et al. |
| 8,762,906 B2 | 6/2014 | Ginetti et al. |
| 8,769,455 B1 | 7/2014 | Singh et al. |
| 8,806,405 B2 | 8/2014 | Colwell |
| 8,898,039 B1 | 11/2014 | Kukal et al. |
| 8,910,100 B1 | 12/2014 | Wilson et al. |
| 2003/0051222 A1 | 3/2003 | Williams et al. |
| 2003/0196182 A1 | 10/2003 | Hahn |
| 2004/0034842 A1* | 2/2004 | Mantey et al. ............ 716/15 |
| 2005/0273732 A1* | 12/2005 | Xu et al. .............. 716/2 |
| 2006/0111884 A1 | 5/2006 | McGaughy et al. |
| 2007/0229537 A1 | 10/2007 | Kohli et al. |
| 2008/0301600 A1* | 12/2008 | Kumagai ............ 716/5 |
| 2009/0007031 A1 | 1/2009 | Ginetti et al. |
| 2010/0031209 A1 | 2/2010 | Luan et al. |
| 2010/0115207 A1 | 5/2010 | Arora et al. |
| 2010/0306729 A1 | 12/2010 | Ginetti |
| 2011/0041106 A1 | 2/2011 | Li et al. |
| 2011/0061034 A1 | 3/2011 | Ginetti et al. |
| 2011/0153288 A1 | 6/2011 | Bhattacharya et al. |
| 2011/0153289 A1 | 6/2011 | Bhattacharya et al. |
| 2011/0154276 A1* | 6/2011 | Bhattacharya et al. ....... 716/100 |
| 2011/0161899 A1 | 6/2011 | Ginetti et al. |
| 2011/0161900 A1 | 6/2011 | Ginetti et al. |
| 2011/0173582 A1* | 7/2011 | Bhattacharya et al. ....... 716/106 |
| 2012/0047434 A1 | 2/2012 | Ginetti |
| 2013/0097572 A1 | 4/2013 | Ginetti et al. |
| 2013/0246900 A1 | 9/2013 | Ginetti et al. |
| 2013/0290834 A1 | 10/2013 | Ginetti et al. |
| 2014/0123094 A1 | 5/2014 | Colwell et al. |
| 2014/0223402 A1* | 8/2014 | Satou et al. ............ 716/126 |

OTHER PUBLICATIONS

Stuart Sutherland, "Verilog HDL: Quick Reference Guide" 2001.
"Summary of Verilog Syntax" URL: http://www.verilogtutorial.info/chapter_3.htm, 2007, Accessed on Sep. 2, 2014.
Non-Final Office Action dated Apr. 13, 2015 for U.S. Appl. No. 14/503,408.
Non-Final Office Action dated Apr. 16, 2015 for U.S. Appl. No. 14/503,407.
Notice of Allowance dated Oct. 28, 2015 for U.S. Appl. No. 14/503,407.
Notice of Allowance dated Oct. 29, 2015 for U.S. Appl. No. 14/503,408.
*Ex-parte Quayle* Action dated Nov. 2, 2015 for U.S. Appl. No. 14/503,404.

* cited by examiner

METHOD, SYSTEM, AND COMPUTER PROGRAM PRODUCT FOR CHECKING, VERIFYING, OR TESTING A MULTI-FABRIC ELECTRONIC DESIGN SPANNING ACROSS MULTIPLE DESIGN FABRICS

CROSS-REFERENCE TO RELATED PATENT APPLICATIONS

This patent application claims the benefit of U.S. Prov. Patent App. Ser. No. 62/033,607 filed on Aug. 5, 2014 and entitled "METHOD, SYSTEM, AND COMPUTER PROGRAM PRODUCT FOR IMPLEMENTING, VERIFYING, AND/OR ANALYZING A MULTI-FABRIC ELECTRONIC DESIGN SPANNING ACROSS MULTIPLE DESIGN FABRICS". This application is also cross related to U.S. patent application Ser. No. 14/503,408 filed concurrently and entitled "METHODS, SYSTEMS, AND ARTICLES OF MANUFACTURE FOR BACK ANNOTATING AND VISUALIZING PARASITIC MODELS OF ELECTRONIC DESIGNS", U.S. patent application Ser. No. 14/503,403 filed concurrently and entitled "METHODS, SYSTEMS, AND ARTICLES OF MANUFACTURE FOR IMPLEMENTING A MULTI-FABRIC ELECTRONIC DESIGN SPANNING ACROSS MULTIPLE DESIGN FABRICS", U.S. patent application Ser. No. 14/503,404 filed concurrently and entitled "METHODS, SYSTEMS, AND ARTICLES OF MANUFACTURE FOR PROBING OR NETLISTING A MULTI-FABRIC ELECTRONIC DESIGN SPANNING ACROSS MULTIPLE DESIGN FABRICS", and U.S. patent application Ser. No. 14/503,407 filed concurrently and entitled "METHODS, SYSTEMS, AND ARTICLES OF MANUFACTURE FOR ANALYZING A MULTI-FABRIC ELECTRONIC DESIGN AND DISPLAYING ANALYSIS RESULTS FOR THE MULTI-FABRIC ELECTRONIC DESIGN SPANNING AND DISPLAYING SIMULATION RESULTS ACROSS MULTIPLE DESIGN FABRICS". The contents of the aforementioned U.S. provisional patent application and U.S. patent applications are hereby incorporated by reference in their respective entireties for all purposes.

BACKGROUND

In conventional electronic designs, the integrated circuits, the IC (integrated circuit) packaging, and the printed circuit boards are often developed and designed independently. Modern electronic designs often require or desire the integrated circuit, their respective packaging, and the printed circuit board incorporating multiple packaged integrated circuits to be developed in a multi-fabric environment. That is, one designer may need or desire to design in the context of the others. For example, the integrated circuit designer may need or desire to implement the integrated circuit design in view of the contexts of the packaging fabric as well as the printed circuit board fabric.

Similarly, a printed circuit board designer may desire to implement or tune the printed circuit design in the context of the packaging design fabric and/or the integrated circuit design fabric. As a practical example, consider the situation where an advanced package is to be incorporated onto a PCB (printed circuit board) for a consumer product that is driven by cost considerations and performance. In conventional approaches, while device placement and assignment decisions made solely in the context of the chip may yield the ideal chip-level design, these device placement and assignment decisions could nevertheless result in missing the cost or performance goals for the end consumer product. In these convention approaches, the chip-level placement usually dictates, for example, the bump and ball assignments in the downstream fabrics that may result in excessive coupling in the interfaces and a complex routing scheme that requires additional layers in the package and/or PCB substrates.

Therefore, there exists a need for a multi-fabric design environment that provides a coherent framework to integrate the integrated circuit design fabric, the packaging design fabric, and the printed circuit board fabric in a seamless manner.

SUMMARY

Disclosed are method(s), system(s), and article(s) of manufacture for checking, verifying, or testing a multi-fabric electronic design across multiple design fabrics in one or more embodiments. Some embodiments are directed at a method for checking, verifying, or testing a multi-fabric electronic design across multiple design fabrics. The method may receive a request for checking correctness of a multi-fabric electronic design across at least a first design fabric and a second design fabric; automatically transmit a request for action related to the request from a first session of a first electronic design automation (EDA) tool to a second session of a second EDA tool; identify second connectivity information for second design data in the second design fabric by using the second session of a second EDA tool in response to the request for action; and check the correctness of the multi-fabric design in the first design fabric with the first session of a EDA tool by using at least the second connectivity information.

In some embodiments, the first design data are native to the first EDA tool and non-native to the second EDA tool, and the second design data are native to the second EDA tool and non-native to the first EDA tool. In addition or in the alternative, the method that checks the correctness may further descend or ascend a hierarchy of the multi-fabric electronic design, wherein the hierarchy includes a first hierarchy for the first design fabric and a second hierarchy for the second design fabric. In some embodiments, the method may further determine pertinent information related to the request at or near a boundary between the first design fabric and the second design hierarchy, and transmit the request for action and the pertinent information from the first session of the first EDA tool to the second session of the second EDA tool, wherein the pertinent information is included in or accompanied by the request for action.

To check the correctness of the first design data in the first design fabric, the method may further determine one or more second symbolic representations for the second design data, and representing the second design data with the one or more second symbolic representations in the first design fabric using the first session of the first EDA tool in some embodiments. In some of the immediately preceding embodiments, the method may further identify first connectivity information of at least a part of the first design data using the first session of the first EDA tool; identify second symbolic connectivity information for the one or more second symbolic representations in the first session of the first EDA tool; and check the first connectivity information against second symbolic connectivity information or the second connectivity information.

In some embodiments, the method may further check the correctness of the multi-fabric design in the second design fabric with the second session of the second EDA tool. In some of these embodiments, the method may also automatically transmit a first request for action from the second session of the second EDA tool to the first session of the first EDA tool; identify first connectivity information for the first design data in the first design fabric by using the first session of the first EDA tool in response to the first request for action; and check the correctness of the multi-fabric design in the second design fabric with the second session of the second EDA tool. In addition or in the alternative, the method may further determine one or more first symbolic representations for the first design data; and represent the first design data with the one or more first symbolic representations in the second design fabric using the second session of the second EDA tool.

Alternatively or additionally, the method may identify first symbolic connectivity information for the one or more first symbolic representations in the second session of the second EDA tool, and check the second connectivity information against the first symbolic connectivity information or the first connectivity information. The multi-fabric electronic design includes a partial, incomplete design that includes no design data for at least one design component, or the multi-fabric electronic design does not satisfy one or more design rules or constraints before the request for processing the multi-fabric electronic design is fulfilled in some embodiments. In addition or in the alternative, a first portion including the first design data is operatively connected to a second portion including the second design data in the multi-fabric electronic design. Optionally, the method may identify inconsistency between a first representation of the first design data and a second representation of the second design data, identify the inconsistency with one or more markers, and fix the inconsistency.

In some embodiments including a test vector, the method may apply a test vector to a first portion including the first design data of the multi-fabric electronic design by using the first EDA tool, identify a first set of output generated by the first portion of the multi-fabric electronic design in response to the test vector, correlate the request for action with the first set of output, and determine whether the first portion of the multi-fabric electronic design functions correctly by using at least the first set of output. In some of these embodiments, the method may further apply the first set of output generated by the first portion to a second portion including the second design data of the multi-fabric electronic design by using the second EDA tool, identify a second set of output generated by the second portion of the multi-fabric electronic design in response to the first set of output, and determine whether the second portion of the multi-fabric electronic design functions correctly by using at least the second set of output.

Some embodiments are directed at a hardware system that may be invoked to perform any of the methods, processes, or sub-processes disclosed herein. The hardware system may include at least one processor or at least one processor core, which executes one or more threads of execution to perform any of the methods, processes, or sub-processes disclosed herein in some embodiments. The hardware system may further include one or more forms of non-transitory machine-readable storage media or devices to temporarily or persistently store various types of data or information. Some exemplary modules or components of the hardware system may be found in the System Architecture Overview section below.

Some embodiments are directed at an article of manufacture that includes a non-transitory machine-accessible storage medium having stored thereupon a sequence of instructions which, when executed by at least one processor or at least one processor core, causes the at least one processor or the at least one processor core to perform any of the methods, processes, or sub-processes disclosed herein. Some exemplary forms of the non-transitory machine-readable storage media may also be found in the System Architecture Overview section below.

BRIEF DESCRIPTION OF THE DRAWINGS

The drawings illustrate the design and utility of various embodiments of the invention. It should be noted that the figures are not drawn to scale and that elements of similar structures or functions are represented by like reference numerals throughout the figures. In order to better appreciate how to obtain the above-recited and other advantages and objects of various embodiments of the invention, a more detailed description of the present inventions briefly described above will be rendered by reference to specific embodiments thereof, which are illustrated in the accompanying drawings. Understanding that these drawings depict only typical embodiments of the invention and are not therefore to be considered limiting of its scope, the invention will be described and explained with additional specificity and detail through the use of the accompanying drawings in which.

DETAILED DESCRIPTION

Figure 1:
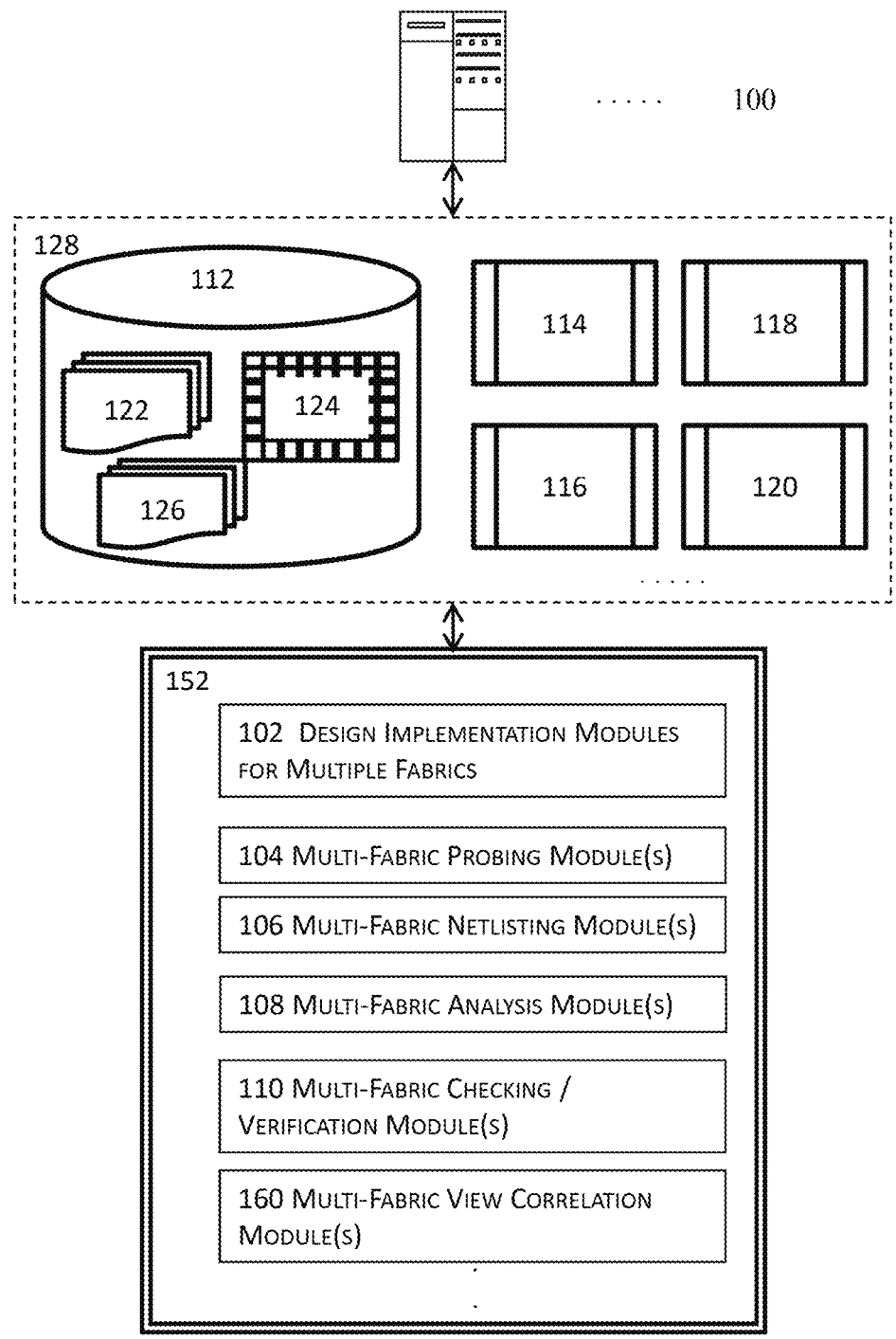
FIG. 1 illustrates a high level block diagram of a system for checking, verifying, or testing a multi-fabric electronic design across multiple design fabrics in some embodiments.

Various embodiments of the invention are directed to methods, systems, and articles of manufacture for checking, verifying, or testing a multi-fabric electronic design across multiple design fabrics. Other objects, features, and advantages of the invention are described in the detailed description, figures, and claims.

Various embodiments will now be described in detail with reference to the drawings, which are provided as illustrative examples of the invention so as to enable those skilled in the art to practice the invention. Notably, the figures and the examples below are not meant to limit the scope of the present invention. Where certain elements of the present invention may be partially or fully implemented using known components (or methods or processes), only those portions of such known components (or methods or processes) that are necessary for an understanding of the present invention will be described, and the detailed descriptions of other portions of such known components (or methods or processes) will be omitted so as not to obscure the invention. Further, various embodiments encompass present and future known equivalents to the components referred to herein by way of illustration.

Various embodiments perform planning and/or implementation of electronic devices across multiple fabrics within the context of each other to ensure proper performance as well as flexibility to work at a coarse level to establish initial placement then refine down to the individual byte lanes as a design emerges. In addition, these embodiments provide designers with the capability to quickly effectuate design changes (e.g., placement and net changes) in one fabric and immediately see the impact on adjacent fabrics by uniting design information or data of various sources and formats across multiple fabrics at various granularities and also by communicating data back and forth for the design implementation tools (e.g., electronic design automation or EDA tools) in multiple design fabrics to complete their respective designs.

These embodiments establish the relationship between the chip, chip package, the board, and the test bench by using hierarchy management techniques to establish and manage the relationships among the fabrics to enable representations of the complete system from the chip-level to the PCB (printed circuit board), while maintaining the integrity of individual design fabrics and providing simultaneous access to domain-specific and/or design fabric-specific data (e.g., macro placement, I/O pad ring devices, bump patterns, ball pad assignments, and placement of critical PCB components and connectors, etc.) These embodiments manage and manipulate a range of multi-fabric data at various stages of completeness of the design, and adapt as portions of the design become less abstract or more complete during the planning and/or implementation process.

In various embodiments, various techniques described herein are not limited to planning or implementation of electronic designs across multiple design fabrics but also across multiple design domains (e.g., schematic domain, layout domain, etc.) For example, these techniques provide the capabilities of planning and implementation of an IC layout design in the IC layout domain of the IC design fabric in light of a PCB schematic design in the PCB schematic design domain of the PCB design fabric such that designers may implement the IC layout while, for example, knowing the impact of the IC layout design and the PCB schematic design on each other in some embodiments.

These techniques may also provide the capabilities of planning and implementation of an IC packaging layout design in the IC packaging layout domain of the IC packaging design fabric in light of a test bench layout in the test bench layout design domain of the test bench design fabric such that designers may implement the IC packaging layout while, for example, knowing the impact of the test bench layout design and the IC packaging layout design on each other in some embodiments. As another example, some techniques described herein may properly map and check IC layout IOs (inputs/outputs) concurrently. As yet another example, some techniques described herein allow the concurrent implementation of IC logical-schematic symbol pins and IC schematic interfaces within the context of each other. Some techniques described herein allow concurrent implementation of IC physical-schematic symbol pins to IC layout IO pins within the context of each other.

Figure 3A:
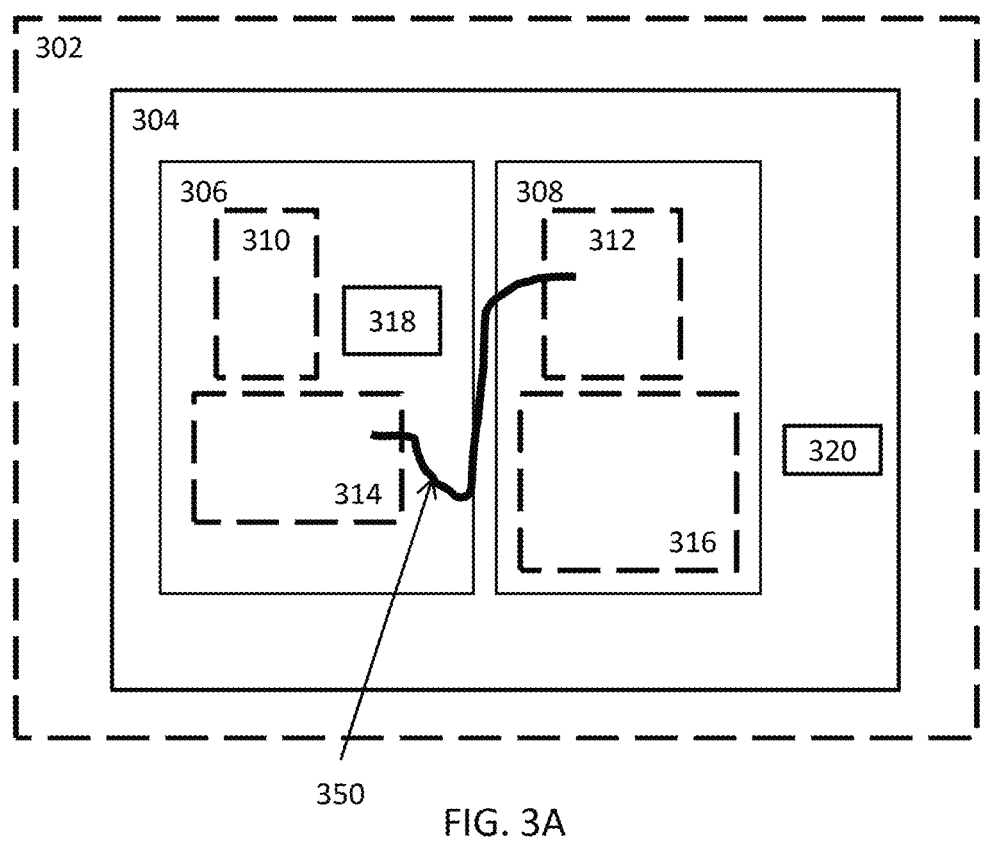
FIG. 3A illustrates a simplified schematic illustration of a multi-fabric electronic design in some embodiments.
Figure 3B:
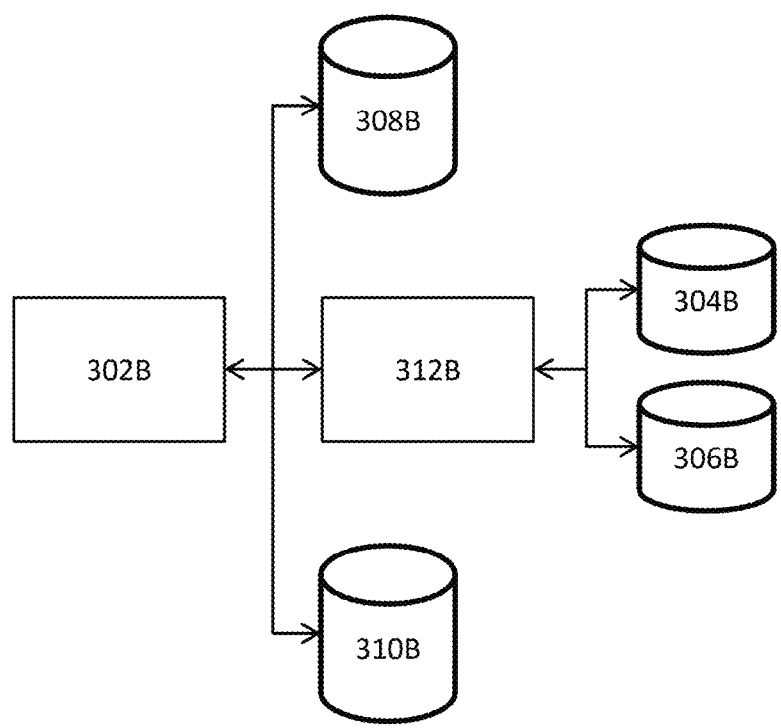
FIG. 3B illustrates a cluster of computing systems that may be used to implement various techniques and methodologies for a multi-fabric design environment described herein in some embodiments.
Figure 3C:
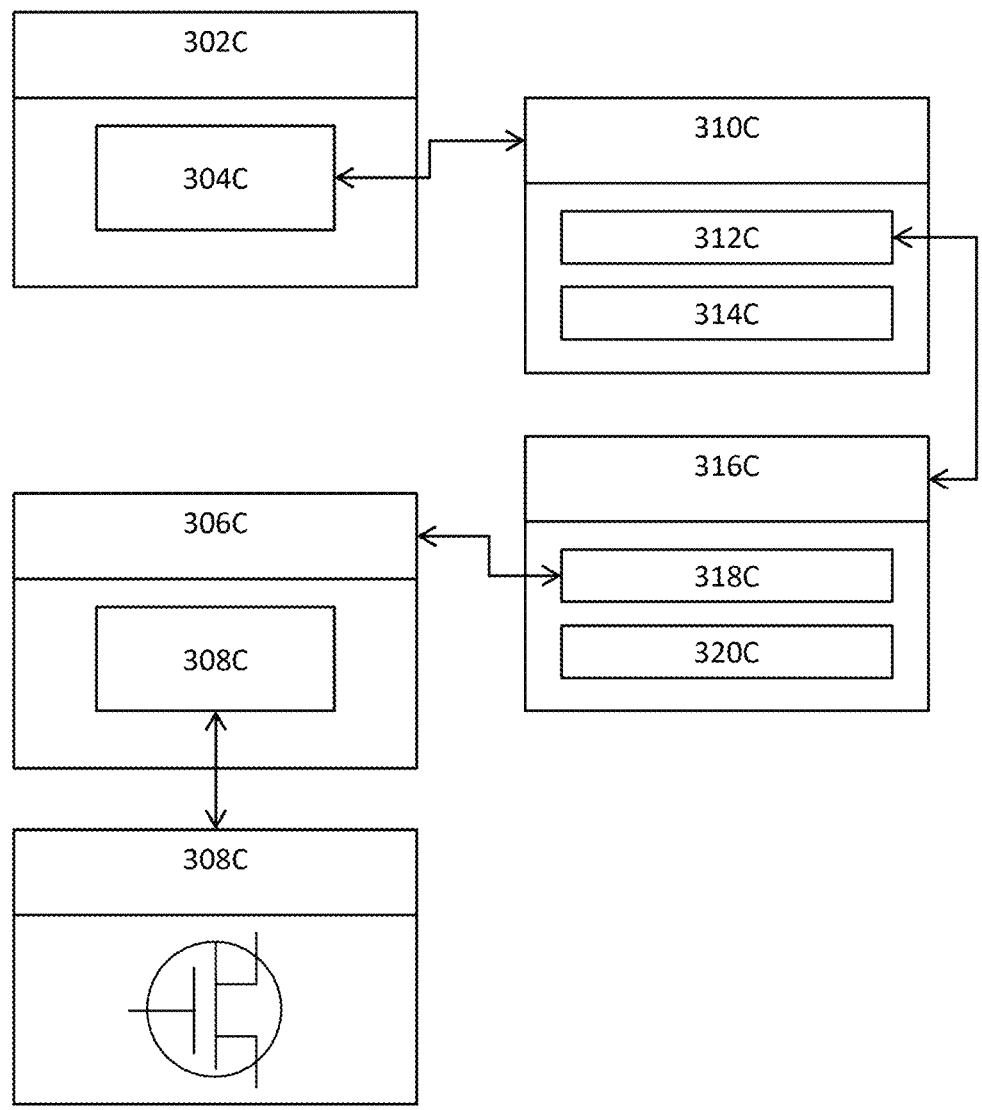
FIG. 3C illustrates a simplified test bench design including various instances to which various techniques and methodologies apply in some embodiments.
Figure 3D:
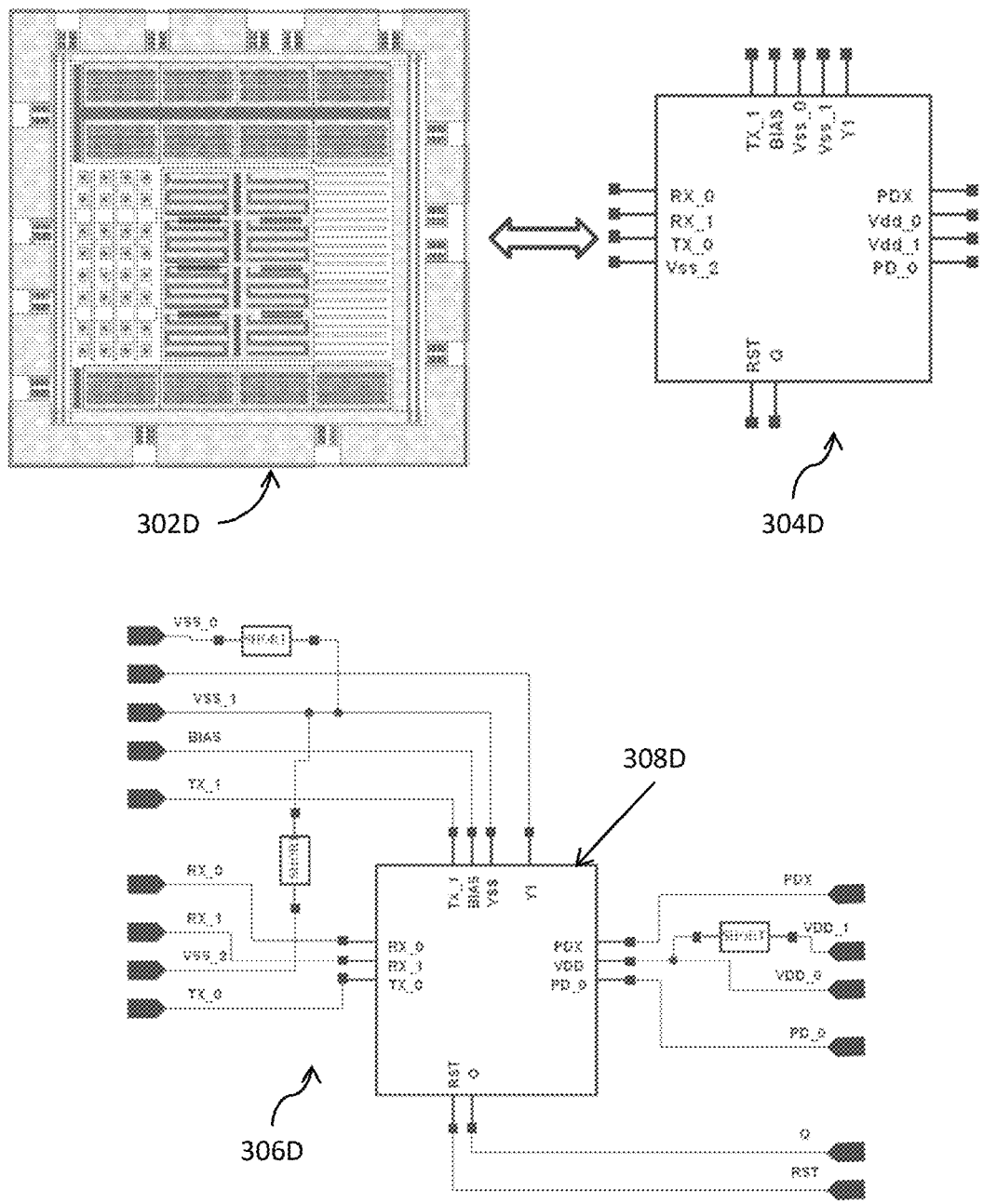
FIG. 3D illustrates an example of cross checking logical models or symbols against corresponding schematic or layout instances or information thereof in some embodiments.

FIG. 3D illustrates an example of cross checking logical models or symbols against corresponding schematic or layout instances or information thereof in some embodiments. For example, this figure illustrates the layout 302D of an IC design, the corresponding model or symbol representation 304D for the IC design that may be used in a PCB design tool, and the PCB schematic representation 306D including the representation of the same IC design 308D. As illustrated in FIG. 3D, the IC design includes two Vdd pins (e.g., Vdd_0, Vdd_1) as well as two Vss pins (e.g., Vss_0 and Vss_1) in both the IC layout 302D and the model representation 304D for the IC design in, for example, the PCB design fabric. Nonetheless, these two Vdd pins and two Vss pins are respectively represented as a single Vdd pin and a single Vss pin in 308D.

In other words, the model representation 308D represents these two Vdd pins with a single logic symbol ("Vdd" in 308D and these two Vss pins with a single logic symbol "Vss" in 308D). Various techniques described herein process multi-fabric electronic design across multiple design fabrics but also allow concurrent implementation of logical and schematic/layout symbols for at least the interface elements between design fabrics with the context of each other by exposing or associating such logical and schematic/layout symbols for at least the interface elements to automatically and correctly cross design domains (e.g., schematic domain, layout domain, etc.) and design hierarchies.

Figure 3E:
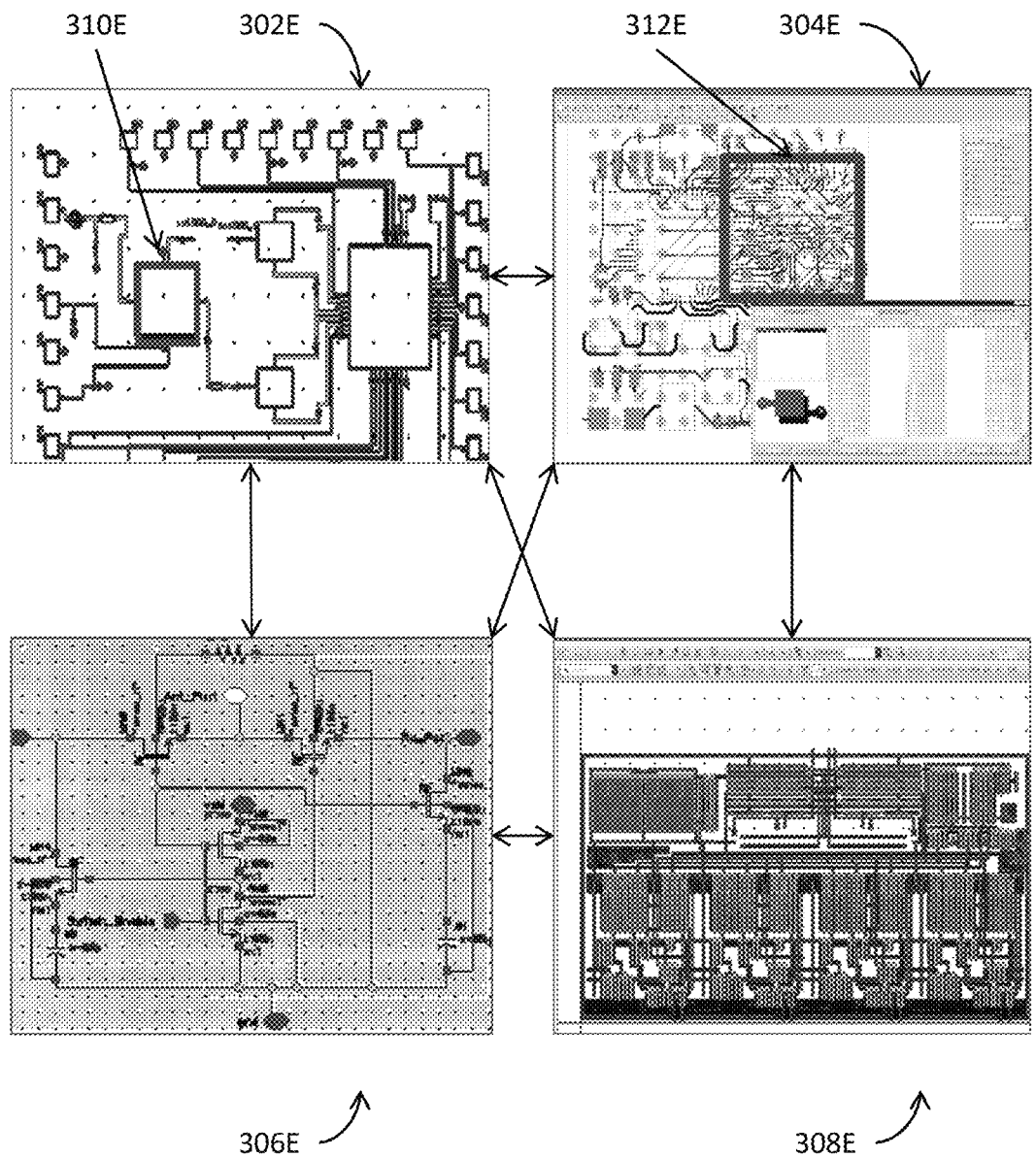
FIG. 3E illustrates some examples of automatically navigating between different design domains in the same design fabric or even in different design fabrics in some embodiments.

Various embodiments described herein automatically cross multiple design domains in the same design fabric or even different design fabrics to perform various tasks by using respective EDA tools to natively access design data in specific design domains in design fabrics. Referring to FIG. 3E as an example, FIG. 3E illustrates that various techniques described herein automatically cross the boundaries between different design domains in the same design fabric or even in different design fabrics. FIG. 3E illustrates some examples of automatically navigating between different design domains in the same design fabric or even in different design fabrics in some embodiments. More specifically FIG. 3E illustrates an IC package design schematic 302E in an IC packaging design schematic tool session, an IC design schematic 306E in an IC design layout tool session, an IC package design layout 304E in an IC package design layout tool session, and an IC design layout 308E in an IC design layout tool session. The box 310E in the IC package design schematic 302E is illustrated in 306E, which illustrates the IC design schematic. The box 312E in IC package design layout is illustrated in 308E, which illustrates the IC design layout.

The methods or system may automatically cross the boundaries between different design domains by using the techniques to identify or instantiate the proper EDA tools. For example, the method or system may jump between the IC package design schematic illustrated in 302E and the IC design layout 308E to check whether the interface elements (e.g., I/O pins) between the IC model in the IC package design correctly correspond to the I/O pin shapes in the IC design layout or vice versa. For example, whether the logical symbols of the interface elements in the IC package design schematic in 302E may be checked to determine whether these logical symbols correctly correspond to physical shapes, instances, or their respective identifications in the IC layout in 308E or vice versa.

The method may also jump between the IC package design layout illustrated in 304E and the IC design schematic illustrated in 306E to check whether the logical interface elements (e.g., I/O pins) in the IC design schematic 306E correctly correspond to the I/O pins in the IC design layout in FIG. 304E or vice versa. The method or system may also jump between 302E and 304E to perform, for example, layout-versus-schematic check for the package design or between 306E and 308E to perform, for example, layout-versus-schematic check for the IC design. The method or system may also jump between the IC package design schematic in 302E and the IC design schematic in 304E to check whether the IC design schematic in 306E is correctly interconnected in the IC package design in 302E or whether the schematic instances of the interface elements (e.g., pins) are correctly mapped. The method or system may further jump between the 306E and 308E to check whether the IC layout in 306E is correctly interconnected in the IC package layout in 308E.

In some embodiments, the techniques and methodologies described herein provide a multi-fabric design environment in an efficient and cost effective manner. One embodiment may implement such a multi-fabric design environment including various details of the packaging design and the printed circuit board design at different abstraction or hierarchical levels with different granularities in one or more integrated circuit design tools (e.g., a layout editor or a schematic editor). Such an implementation may leverage the editing, simulation, checking, verifying, testing, and analysis capabilities of the one or more integrated circuit design tools. Some embodiments may use different sets of design constraints or design rules (e.g., constraints or rules for a die design versus constraints or rules for a printed circuit board design) or even different domains of characteristics (e.g., electrical characteristics of electronic circuit designs versus physical characteristics of packaging or printed circuit board designs) of integrated circuit designs, packaging designs, and printed circuit board designs in performing various functions or acts described herein. Some other embodiments use a single unified set of design constraints or design rules or a single, unified data structure that has one or more common formats to accommodate different domains of characteristics in performing the functions or acts described herein.

Yet some other embodiments use two or more sets of views for different abstraction levels of the integrated circuit designs, the packaging design, and the printed circuit design. The two or more sets of views for different abstraction levels may include, for example, a set of symbolic views and a set of schematic views or layout views in some of these embodiments. A symbolic view of a block of circuit elements may include a symbol or a place holder for the block and may or may not have the correct dimensions to represent the actual area occupied by the block of circuit elements. A symbolic view of a block of circuit elements may also include some interface information such as the types of ports, terminals, pins, or pads (collectively ports hereinafter) interfacing with external circuit elements, the number of each type of ports, or the identification of each port in some embodiments. In some of these embodiments, a symbolic view of a block of circuit elements may further include the correct dimensions or location of at least one port interfacing with external circuitry. In these aforementioned embodiments, a symbolic view of a block of circuit elements includes some design data of the block at its boundary (e.g., data or information about the interface to external circuit components) yet does not include detailed design data for circuit components inside the boundary of the block.

In some embodiments, a symbolic view of a block of circuit component designs and the corresponding one or more schematic views and/or one or more corresponding layout views of the block at one or more granularities or hierarchical levels may be stored in one or more data structures such that various processes, systems, modules, or even the designers may access any such schematic or layout at the desired granularity or hierarchical level automatically, manually, interactively, or on demand. The two or more sets of view may further include other views such as layout views, gate level views, etc. at various other abstraction levels. With these two or more sets of views, these embodiments provide each design tool in each fabric with the appropriate set of views such that the design tool can properly perform its dedicated functionality. A multi-fabric electronic design may have a hybrid hierarchy including a plurality of design fabrics, some of which may be included in others to form a hierarchical structure. For example, a PCB design may exist at a first hierarchical level in the PCB design fabric. The PCB design may further include an IC package which exists at a second hierarchical level under the first hierarchical level, and the IC package design may belong to the package design fabric. The IC package design may further include the IC design at a third hierarchical level for the IC design fabric under the second hierarchical level, at which the IC package design is situated. Unlike conventional hierarchical designs, the designers are not freely to ascend or descend the hierarchical structure because designs in different design fabrics may be described in different languages or formats and thus do not communicate with each other to provide the freedom for designers to freely move from one design fabric in one EDA tool session to another design fabric in another EDA tool session.

For example, some embodiments may provide the integrated circuit schematic view including the schematic design of a cell to the schematic editor or a schematic simulator such that the schematic editor may properly implement or simulate the schematic design represented by the integrated circuit schematic view. As another example, these embodiments may further provide a schematic view including the schematic design of a printed circuit board or an IC packaging design to the printed circuit board schematic editor or IC packaging schematic editor, respectively. These two or more sets of views may be stored in parallel and linked automatically in a streamline fashion such that a designer may navigate among different abstraction levels at various granularity levels. Moreover, various views at various granularity levels in different design fabrics may be tracked using one or more data structures that link, for example, a specific view (e.g., a schematic view of a cell) to the appropriate information or data (e.g., schematic design data of the cell). These one or more data structures may be of the same format or of different formats.

In addition or in the alternative, some embodiments may further provide symbolic views of circuit block designs or portions thereof to an electronic circuit design tool that performs its dedicated or intended functions in light of one or more other designs in one or more other fabric(s) as represented by the symbolic views. For example, the integrated circuit designer may use the integrated circuit schematic editor or simulator or layout editor to implement the physical design of an IC in light of the IC packaging design fabric and/or the printed circuit board design fabric. These embodiments may then provide the IC packaging design as a symbolic IC packaging design view and/or the printed circuit board design as a symbolic printed circuit board design view to the IC designer such that the IC designer may implement the IC design within the context and in light of the pertinent information of the IC packaging and/or the printed circuit board design.

Similarly, the IC packaging designer may also be provided with a symbolic integrated circuit design view for the integrated circuit design having sufficient design information or data for the IC packaging designer to implement or tune the IC packaging design in the context of the integrated circuit design. Each design tool therefore sees what the design tool needs to perform its intended or dedicated functions and is not burdened with unnecessary information that may adversely impacts the performance, effectiveness, and/or functionality of the design tool, while still receiving sufficient information or data from other fabrics or abstraction levels to aid the designer in using the design tool to implement or tweak the respective designs.

In addition to implementing or tweaking (e.g., fixing, improving, or optimizing) a design at a particular abstraction level in a specific fabric, another advantage of these embodiments is that a design team working in different geographies may transmit some form of abstracted design information or data from a first team member (e.g., an IC designer) working in a first fabric at the first location to a second team member (e.g., an IC packaging designer) working in a second fabric at a second location. The second team member may not only implement or tweak his or her own design within the context of the design in the first fabric but also revise and transmit the abstracted design back to the first team member who may in turn accept, partially accept, or reject the revised abstracted design.

Yet another advantage of these embodiments is that these embodiments may better manage large block or cell symbols by splitting a large symbol into multiple split symbols and placing its ports across design schematics, especially near the circuitry to which they are connected. As the complexity of the designs is constantly increasing and more and more logic is being placed inside hierarchical blocks, the number of interfaces that are exposed by the hierarchical block has increased dramatically such that the increased number of interfaces means more pins are required on the block symbol. As a result, a block symbol may become so large (e.g., a device having a large pin count) that it may not be placed on a standard page border. Such a large block symbol (or a block symbolic representation) may also become difficult to manage because of the sheer number of pins coming out of the same symbol. Various embodiments described herein also better manage hierarchical block symbols by splitting these symbols into multiple split symbols. Rather than generating a big monolithic symbol, these embodiments provide an option to split the ports of a hierarchical block over multiple symbols. Splitting a large symbol into multiple split symbols reduces the size of the large symbol. In addition, these embodiments may logically categorize the ports and placed these ports on different symbols to create symbols that may be placed across, for example, schematic sheets, especially near the circuitry to which they connect to. In splitting a larger symbol or representation into multiple, smaller symbols or representations, an identification (e.g., a name or other types of identifier) may also be split into multiple split identifications corresponding to the multiple, smaller symbols.

In one or more embodiments, FIG. 1 shows an illustrative high level schematic block diagrams for checking, verifying, or testing a multi-fabric electronic design across multiple design fabrics and may comprise one or more computing systems 100, such as a general purpose computer described in the System Architecture Overview section to implement one or more special proposes. In some embodiments, the one or more computing systems 100 may invoke various system resources such as the processor(s) or processor core(s), memory, disks, etc. The one or more computing systems 100 may also initiate or interact with other computing systems to access various resources 128 that may comprise a floorplanner, a global routing engine, and/or a detail routing engine 114, a layout editor 116, a design rule checker 118, a verification engine 120, etc. The one or more computing systems 100 may further write to and read from a local or remote volatile or non-volatile computer accessible storage 112 that stores thereupon data or information such as, but not limited to, one or more databases (124) such as schematic design database(s) or physical design database(s), electronic circuit design specification database(s), various statistics, various data, rule decks, various design rules, constraints, etc. (122), or other information or data (126) that may be used to facilitate the performance of various functions to achieve the intended purposes.

In some embodiments, the one or more computing systems 100 may, either directly or indirectly through various resources 128 to invoke various software, hardware modules or combinations thereof in a multi-fabric design environment 152 that may comprises a plurality of design implementation modules 102 (e.g., schematic design tool, layout tool, etc.) to insert, remove, modify, improve, optimize, or otherwise operate upon designs in different fabrics (e.g., the die design fabric, the integrated circuit or IC packaging design fabric, the printed circuit board or PCB design fabric, the test bench design fabric, etc.), one or more multi-fabric probing modules 104 to probe multi-fabric designs across multiple design fabrics, one or more multi-fabric netlisting modules 106 to netlist multi-fabric designs across multiple design fabrics, one or more multi-fabric analysis modules 108 to simulate or analyze multi-fabric design across multiple design fabrics, one or more check or verification modules 110 to check or verify the correctness of multi-fabric designs across multiple design fabrics, and one or more multi-fabric view correlation modules 160 to correlate various symbolic views, schematic views, and/or layout views with the schematic design data or the layout data in different design fabrics at various hierarchical levels, etc.

A symbolic view of a block of circuit elements may include a symbol or a place holder for the block and may or may not have the correct dimensions to represent the actual area occupied by the block of circuit elements. A symbolic view of a block of circuit elements may also include some interface information such as the types of ports, terminals, pins, or pads (collectively ports hereinafter) interfacing with external circuit elements, the number of each type of ports, or the identification of each port in some embodiments. In some of these embodiments, a symbolic view of a block of circuit elements may further include the correct dimensions or location of at least one port interfacing with external circuitry. In these aforementioned embodiments, a symbolic view of a block of circuit elements includes some design data of the block at its boundary (e.g., data or information about the interface to external circuit components) yet does not include detailed design data for circuit components inside the boundary of the block. In some embodiments, a symbolic view of a block of circuit component designs and the corresponding one or more schematic views and/or one or more corresponding layout views of the block at one or more granularities or hierarchical levels may be stored in one or more data structures such that various processes, systems, modules, or even the designers may access any such schematic or layout at the desired granularity or hierarchical level automatically, manually, interactively, or on demand.

In some embodiments, a symbolic view may be stored or linked together with a schematic view or layout view of a circuit component, block, or cell by using, for example, a profile. The profile may further include or be associated with other information or data including, for example, parasitic information (e.g., capacitances, resistances, etc.), electrical information (e.g., currents, voltages, inductances, etc.), physical information (e.g., sizes or profiles of various shapes, etc.), timing or delay information of the electronic design of interest, other performance-related information, analysis results (e.g., EMI or electromagnetic interference analyses, ISI or inter-symbol interference analyses, cross-talk analyses, etc.), simulation results in various domains and/or fabrics, or any combinations thereof in some of these embodiments. The multi-fabric view correlation module 160 may also correlate the aforementioned information or data with the multi-fabric electronic design, a portion thereof, or the corresponding designs of circuit component in the multi-fabric electronic design. In some embodiments, the multi-fabric view correlation module 160 may further annotate the pertinent portions or circuit component designs with some or all of the aforementioned information or data.

It shall be noted that the term "symbolic view" and "symbolic representation" may be used interchangeably throughout the application, unless otherwise specifically recited or claimed. The symbolic representation of the printed circuit board may also include some electrical data, characteristics, or parasitics (e.g., power, voltages, currents, resistances, etc.) and/or some physical data or characteristics (e.g., temperature, thermal resistance, thermal RC circuits, etc.) such that the test bench design may be edited, analyzed, and/or simulated in the electrical domain, the physical domain, or both the electrical and physical domains.

In some embodiments, the first representation may be generated or identified for an EDA tool that may include, for example, at least one of an integrated circuit schematic design tool, an integrated circuit physical design tool, and an integrated circuit design simulation tool. In some of these embodiments where the first representation already exists, the method or system may identify the existing, first representation. In some other embodiments where the first representation does not exist, the method or system may generate the first representation. In some of these embodiments, the multi-fabric electronic design is not entirely implemented or completed on the first EDA tool. In these embodiments, the multi-fabric electronic design is incomplete and may thus fail, for example, a layout versus schematic (LVS) check.

Figure 2A:
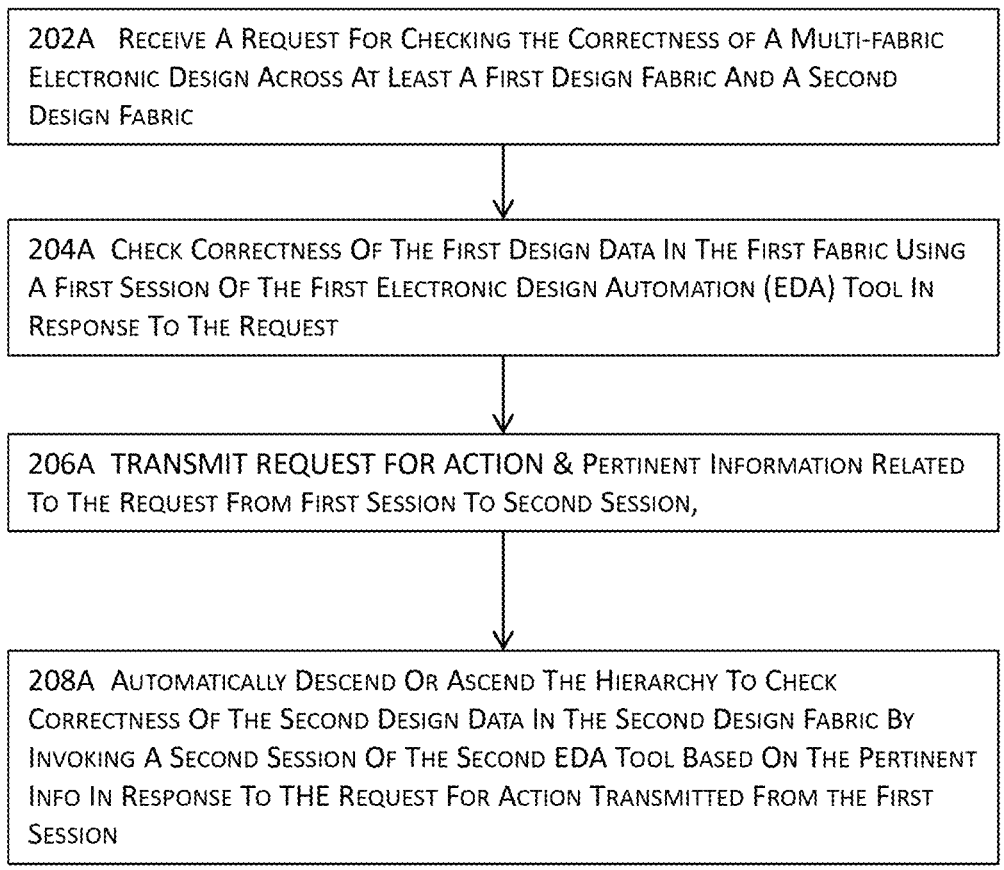
FIG. 2A illustrates a high level block diagram of a method or system for checking, verifying, or testing a multi-fabric electronic design across multiple design fabrics in some embodiments.

FIG. 2A illustrates a high level block diagram for a method or system for checking, verifying, or testing a multi-fabric electronic design across multiple design fabrics in some embodiments. In these embodiments illustrated in FIG. 2A, the method or system may receive a request for checking, verifying, or testing a multi-fabric electronic design across at least a first design fabric and a second design fabric at 202A. For example, the method or system may receive a request from a designer or from an initiative of an EDA tool to check or verify the correctness of the multi-fabric electronic design across multiple design fabrics or to run one or more test vectors across multiple design fabrics of a multi-fabric electronic design. In some embodiments, the first design fabric may comprise an IC design fabric, a printed circuit board (PCB) design fabric, a packaging design fabric, etc.

The second design fabric is different from the first design fabric and may also include an IC design fabric, a printed circuit board (PCB) design fabric, a packaging design fabric, etc. in these embodiments. A design fabric includes therein one or more types of design data for electronic designs such as schematic design data, physical design (e.g., layout) data, various models (e.g., abstract model, reduced model having a reduced set of design data, simulation models, and/or complex models such as s-parameter models, SPICE or Simulation Program with Integrated Circuit Emphasis sub-circuits, IBIS or Input/Output Buffer Information Specification models, etc.), various views (e.g., a layout view, a schematic view, a cell view, a database view, a symbolic view, etc.) of a design component in an electronic design, or any other suitable data for or associated with any of the aforementioned types of design data, models, views, etc.

A design fabric may include one or more hierarchical levels, and these one or more hierarchical levels are thus distinguishable from design fabrics. For example, an IC design may include a single or multiple hierarchical levels (depending upon whether the IC design has a flat structure or a hierarchical structure) although the entire IC design is considered to fall within the same IC design fabric. Similarly, a packaging design may include one or more hierarchical levels although the entire packaging design is considered to belong to the same packaging design fabric. A PCB design may also include one or more hierarchical levels although the entire PCB design is considered to belong to the same PCB design fabric.

Design data are generally design fabric specific. For example, IC layout editors may not be able to access layout data of an IC packaging or those of a PCB design. Similarly, a PCB schematic editor may not be able to access the schematic design data of an IC design or an IC packaging design. Therefore, EDA tools access, generate, edit, and otherwise manipulate design data that are native to the respective EDA tools. Design data are native to a design fabric and hence various EDA tools and other tools (collectively circuit design tools) for processing the design data in the design fabric (e.g., various simulators, verification engines, waveform viewers, etc.) if these EDA tools for the design fabric may generate, access (e.g., read from or write to), modify, maintain, or otherwise manipulate the design data without using any transforms, mappings, or another processes to translate, map, or otherwise transform the design data into another type or format.

On the other hand, design data are non-native to a design fabric and hence the EDA tools and other tools cannot generate, access (e.g., read from or write to), modify, maintain, or otherwise manipulate the design data without transforming, mapping, or abstracting the design data by using a transform, a mapping, or another process to translate, map, or otherwise transform the design data into another type or format. For example, IC design data (e.g., schematic or layout data) are native to IC design tools (e.g., schematic, layout, or synthesis tools, etc.) but are non-native to tools associated with the PCB design fabric or the packaging design fabric. Within a single design fabric, design data may also be native to a smaller subset of circuit design tools but are non-native to other circuit design tools associated with the design fabric. For example, the schematic design data may be native to various schematic tools (e.g., schematic editor or simulator) in the IC design fabric but may be non-native to other circuit design tools (e.g., layout tools, synthesis tools, etc.) in the same IC design fabric.

Design data that are native to a design fabric may be processed (e.g., implemented, verified, checked, simulated, netlisted, probed, or otherwise analyzed) by using various libraries (e.g., design libraries, runtime libraries, standard intellectual property or IP cells or block libraries, etc.) Design data that are non-native to a design fabric may need to be transformed, mapped, abstracted, exported, reconstructed, or otherwise processed into another form or format before such non-native design data may be processed by various circuit design tools associated with the design fabric in conjunction with various libraries for the design fabric. In addition or in the alternative, some the original libraries and/or constraints associated with the non-native design data may also need to be transformed, mapped, abstracted, exported, reconstructed, or otherwise processed into another form or format before such libraries and/or constraints may be used in the design fabric to which the design data are non-native. In some of these embodiments, the multi-fabric electronic design may include the first and second design fabrics. In some of these embodiments, the multi-fabric electronic design may be incomplete in that at least one design component is not yet added or implemented in the multi-fabric electronic design. In some of these embodiments, the multi-fabric electronic design may not even satisfy a constraint or a design rule and need to be verified, checked, fixed, simulated, or otherwise analyzed.

At 204A, the method or system may check or verify the correctness of first design data or test the portion of the multi-fabric electronic design corresponding to the first design data in the first design fabric by using a first session of a first EDA tool in response to the request for checking, verifying, or testing the multi-fabric electronic design. In some of these embodiments, the first design fabric may include data that are native to the first EDA tool and non-native to the second EDA tool that is associated with the second design fabric. In some of these embodiments, the first EDA tool has no complete connectivity information for the non-native design data although the first EDA tool may nevertheless have some incomplete connectivity or design information for the non-native data in some of these embodiments. For example, the first EDA tool may have information or knowledge about the interface elements (e.g., identifications, directions, constraints, power sensitivities, etc. of pins, terminals, or pads) at or near the interface between the first design fabric and the second design fabric but have otherwise no other information or knowledge at all about the connectivity for interconnections further away from the interface.

In some of these embodiments, no single EDA tools associated with a specific design fabric include or have the knowledge of the complete visibility of the entire design at any hierarchical level. In some embodiments, the first EDA tool has no connectivity information of non-native design data at all. Rather, the first EDA tool may be made aware of various elements at or near the interface between design fabrics and native to the first EDA tool. In these embodiments, the first EDA tool may use, for example, the identification of a pin in the native, first design data and the corresponding connectivity information in a request (e.g., the request for action transmitted from a second EDA tool session associated with the second design fabric) to continue the checking, verification, or testing in order to fulfill the request.

At 206A, the method or system may use, for example, a message passing system to issue a request for action and some pertinent information that is related to the request for checking, verifying, or testing the multi-fabric electronic design. The request for action may identify (if already existing) or instantiate (if non-existing) a second session of a second EDA tool. In addition or in the alternative, the request for action may include or be accompanied by the pertinent information. The pertinent information for the request may include the information that is needed by an EDA tool to continue the checking, verifying, or testing the second design data in the second design fabric in some embodiments. For example, the pertinent information may include interface elements at or near the boundary between the first and the second design fabrics, the information (e.g., identifications) of the interface elements, connectivity information, any information, data, values, etc. for facilitating the testing, checking, or verification of the second design data in the second design fabric, or any combination thereof.

In some embodiments, the second design fabric includes the second data that are native to the second EDA tool and non-native to the first EDA tool associated with the first design fabric. In some of these embodiments, the second EDA tool has no complete connectivity information for the non-native design data although the second EDA tool may nevertheless have some incomplete connectivity or design information for the non-native data in some of these embodiments. For example, the first EDA tool may have information or knowledge (e.g., identifications, directions, constraints, power sensitivities, etc. of pins, terminals, or pads) about the interface elements between or near the first design fabric and the second design fabric but have otherwise no information or knowledge about the connectivity In some of these embodiments, no single design fabric includes the complete visibility of the entire design at any hierarchical level. In some of these embodiments, no single design fabric includes the complete visibility of the entire design at any hierarchical level. In some embodiments, the second EDA tool has no connectivity information of non-native design data at all. Rather, the second EDA tool may be made aware of various interface elements in the design fabric whose design data are native to the second EDA tool. In these embodiments, the first EDA tool may compare the identification of a pin in the native design data to the corresponding information in a request (e.g., the request for action transmitted from another EDA tool associated with anther design fabric) to continue the processing in order to fulfill the request.

At 208A, the method or system may automatically descend or ascend the hierarchy of the multi-fabric electronic design across the boundary between the first design fabric and the second design fabric to continue to check, verify, or test the correctness of the second design data based at least in part upon the pertinent information in response to the request for action from the first session of the first EDA tool. In some of these illustrated embodiments, the request for action may include, for example, a message or an inter-process communication and may be transmitted as a part of or together with the pertinent information to the second session of the second EDA tool. The second session of the second EDA tool may also issue and transmit a return request for action to the first session of the first EDA tool in some embodiments. Similar to the request for action from the first session, the return request for action may also include or be accompanied by some pertinent information such as that included in or accompanying the request for action in some of these embodiments. In addition or in the alternative, the return request for action may include or be accompanied by the results of testing, verifying, or checking the second design data in the second design fabric.

As an example, an IC packaging layout editor compares the destination component (e.g., the identification of a pin at the destination of the net connected to an IC) of a pin in the IC packaging design fabric with the corresponding pin in a symbolic representation of the IC design data native to an IC layout editor to determine whether the net is correctly connected to the respective pin in the IC design. As another example, an IC packaging verification tool may verify the native IC packaging design data in the IC packaging design fabric until the verification in the IC packaging design fabric encounters a symbolic representation, issue a request for action to identify or instantiate an IC design verification tool session, and the IC design verification tool continues the verification of the native, IC design data in the IC design fabric. As another example, a PCB testing tool may use a test vector (e.g., a sequence of input data) to test the PCB design and determine whether the PCB design generates the intended or designed output in response to the test vector.

When the PCB testing tool encounters, for example, a symbolic representation of an IC packaging design, the PCB test tool has no knowledge of the IC packaging design data and may utilize, for example, an integrated message passing system to issue a request for action that identifies (if already existing) or instantiates (if not yet existing) an IC packaging testing tool session to continue the testing in the PCB packaging design fabric with the test vector. The request for action may include or be accompanied by the requisite connectivity information (e.g., the identifications of one or more nets and their corresponding one or more pins to continue to propagate the test vector). The IC packaging testing tool session may use the connectivity information to identify the corresponding pins or ports. The IC packaging testing tool session may further use the test vector or any intermediate outputs generated by the circuit components in the PCB design and involved in transmitting the test vector to continue the testing in the IC packaging design fabric.

Figure 2B:
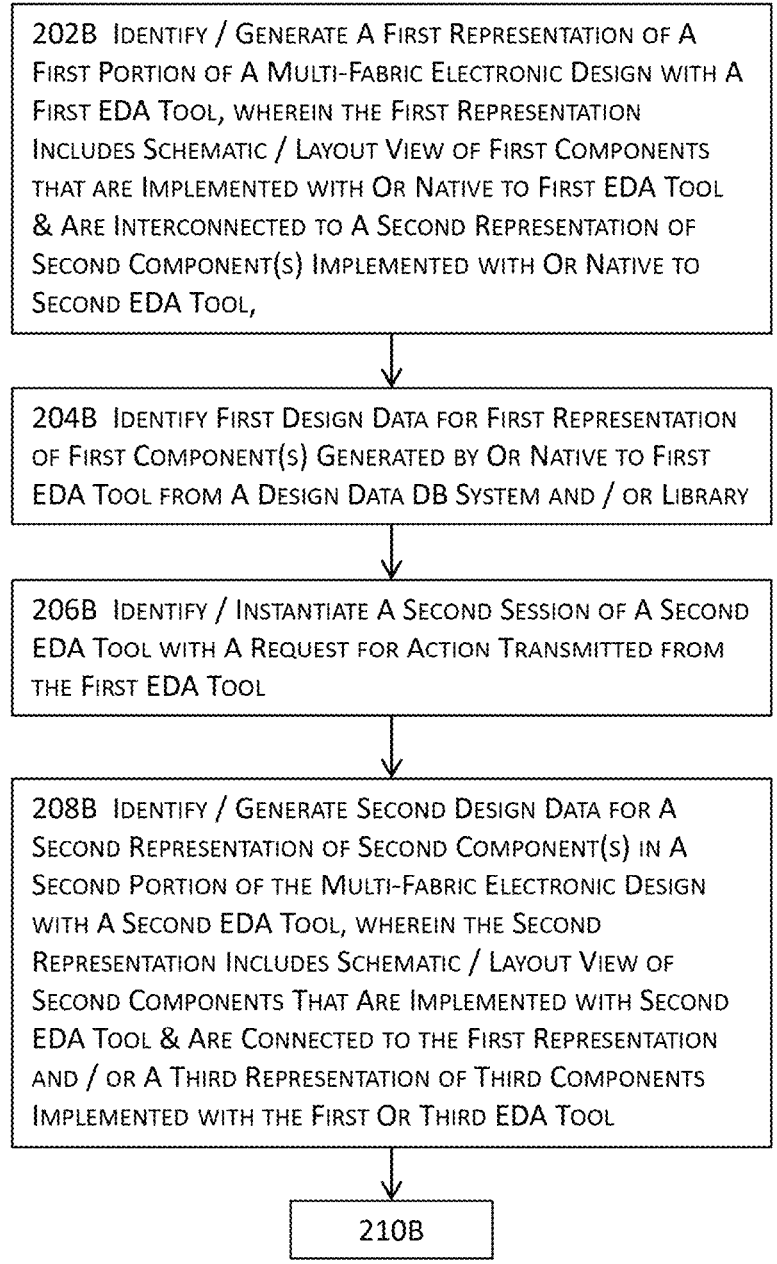
FIGS. 2B-C jointly illustrate a more detailed block diagram of a method or system for checking, verifying, or testing a multi-fabric electronic design across multiple design fabrics in some embodiments.
Figure 2C:
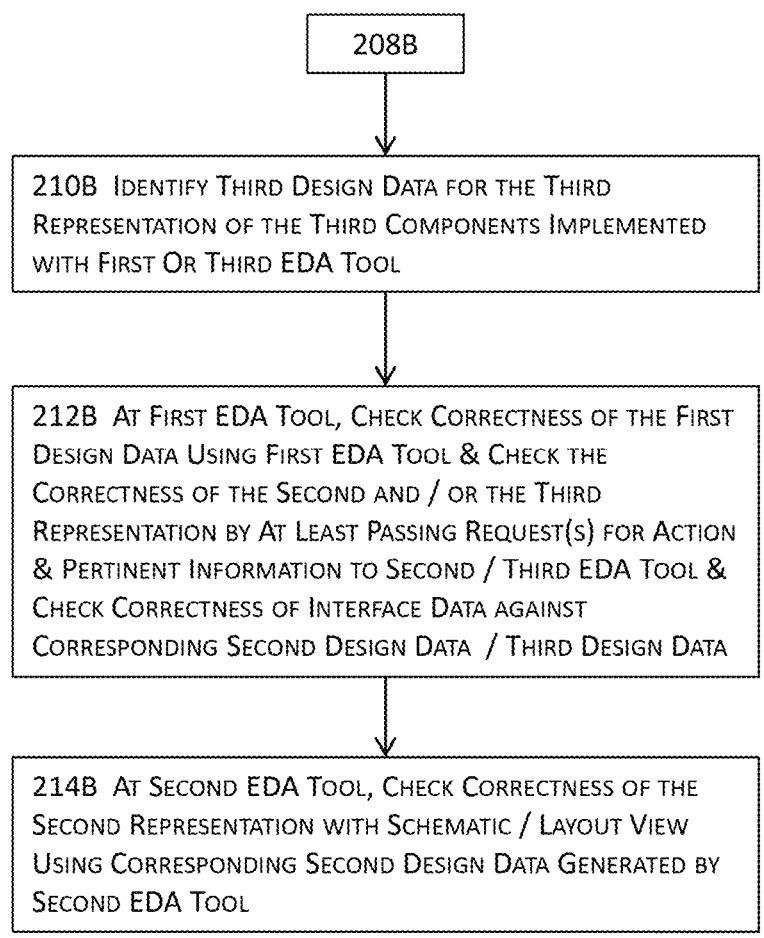

FIGS. 2B and 2C illustrate a flow diagram of a method or system for performing verification on a multi-fabric electronic design in some embodiments. In these embodiments, the method or system may identify (if already existing) or generate (if non-existing) a first representation of a multi-fabric electronic design or a portion thereof with a first EDA tool at 202B. In some of these embodiments, the first representation may include a schematic design view or a layout view of one or more first design components implemented with the first EDA tool (e.g., a schematic suite or a layout suite) and one or more symbolic views of one or more second design components. For example, the first representation of a multi-fabric electronic design may include a test bench design that further includes a symbolic view of a printed circuit board as well as one or more views in one or more abstraction levels (e.g., schematic abstraction level or layout abstraction level) at one or more hierarchical levels or granularities (e.g., levels of details) of one or more discrete electronic design components interconnected with the symbolic view of the printed circuit board in the test bench in some embodiments.

The one or more symbolic representations in the first representation for design data that are non-native to the first EDA tool may be generated by the first EDA tool or the respective EDA tools to which the corresponding symbolic representations are native. In some embodiments where the first EDA tool generates a symbolic representation for second design data, the first EDA tool may use the connectivity information (e.g., nets, pins, etc.) native to the first EDA tool as well as the connectivity information that is non-native to the first EDA tool to facilitate the generation of the symbolic representation. For example, the first EDA tool may issue a request for action to a second EDA tool to inquire into the corresponding connectivity for a net in the first design data and connected to the second design data. The second EDA tool may issue a return request for action in response to the request for action to transmit, for example, the pin names to the first EDA tool. The first EDA tool may use the received pin names or some variants to generate the symbolic representation.

In some embodiments, the first EDA tool may directly assign corresponding connectivity information (e.g., assigning a name to a pin in the second design data and connected to a net in the first design data), use the assigned connectivity information in generating the symbolic representation, and pass the assigned corresponding connectivity information to the second EDA tool by using, for example, a request for action. The second EDA tool may thus correlate or associate the assigned corresponding connectivity information to the internal connectivity information that can be fully accessible by the second EDA tool. For example, the first EDA tool may have identified that a net is connected to a symbolic representation that corresponds to the second design data and the corresponding internal connectivity for which the first EDA tool has no access. The first EDA tool may directly assign one or more pin names for generating and connecting the symbolic representation in the first design fabric. The first EDA tool may further transmit the one or more assigned pin names to the second EDA tool that can natively manipulate the second design data. The second EDA tool may thus correlate the one or more assigned pin names with the internal connectivity.

A symbolic view of a block of circuit elements may include a symbol or a place holder for the block and may or may not have the correct dimensions to represent the actual area occupied by the block of circuit elements. A symbolic view of a block of circuit elements may also include some interface information such as the types of ports, terminals, pins, or pads (collectively ports hereinafter) interfacing with external circuit elements, the number of each type of ports, the identification of each port, or any combinations thereof in some embodiments. In some of these embodiments, a symbolic view of a block of circuit elements may further include the correct dimensions or location of at least one port interfacing with external circuitry.

In these aforementioned embodiments, a symbolic view of a block of circuit elements includes some design data of the block at or near its boundary (e.g., data or information about the interface components to external circuit components) yet does not include detailed design data for circuit components inside the boundary of the block. In some embodiments, a symbolic view of a block of circuit component designs and the corresponding one or more schematic views and/or one or more corresponding layout views of the block at one or more granularities or hierarchical levels may be stored in one or more data structures such that various processes, systems, modules, or even the designers may access any such schematic or layout at the desired granularity or hierarchical level automatically, manually, interactively, or on demand.

At 204B, the method or system may identify first design data for the first representation of one or more first design components from a design data database system or one or more libraries, wherein the schematic view or the layout view is generated by the first EDA tool (e.g., a schematic suite or a layout suite). In the aforementioned example of a test bench design in an IC schematic editor or an IC layout tool, the method or system may identify the schematic design data or layout data for one or more discrete electronic design components interconnected with the symbolic view of the printed circuit board in the test bench in some embodiments. In these embodiments, the representation including a schematic or layout view of design data may be generated by the EDA tools to which the design data are native but not by other EDA tools to which the design data are not native.

An instance of a second EDA tool (e.g., a PCB design tool) may be identified, if already existing, or instantiated, if not yet existing at 206B with the request for action. In some embodiments, the first session of the first EDA tool may issue a request for action including or associated with one or more commands or scripts that identify or instantiate or cause to identify or instantiate the second session of the second EDA tool. The second EDA tool may include an EDA tool that natively creates, modifies, or otherwise manipulates design data in one or more fabrics other than an integrated circuit design fabric in which IC design data (e.g., IC schematics and layouts) are natively accessed, generated, edited, or otherwise manipulated in some embodiments. For example, the method or system may identify a PCB design tool instance (if already existing) or instantiate a PCB design tool instance (if not yet existing) at 206B by using a request for action issued by another EDA tool that does not or cannot natively access, generate, edit, or manipulate the PCB design data in some embodiments. In this example, the PCB design tool instance may be used to manipulate, for example, detailed schematic design data or layout data of the PCB design that exists as a symbolic view in the first EDA tool (e.g., an IC schematic editor or an IC layout tool).

At 208B, the method or system may identify a second representation of a multi-fabric electronic design with the second EDA tool instance in some embodiments. In some of these embodiments, the second representation of a multi-fabric electronic design may include, for example, a schematic or layout view of one or more second components that are native to the second EDA tool and are operatively connected to the first representation in the multi-fabric electronic design. In some of these embodiments, the second representation may further optionally include one or more symbolic views of one or more first and/or third components implemented with the first EDA tool (e.g., an IC schematic editor or an IC layout tool) or a third EDA tool (e.g., an IC packaging design tool).

For example, the printed circuit board design may include an IC package as a symbolic IC package view and one or more discrete components interconnected with the symbolic IC package view in the PCB design in some embodiments. The method or system may also identify or generate a first symbolic representation for displaying and connecting the first design data to the second design data in the second session of the second EDA tool. Similar to the second symbolic representation of the second design data described in 202B, the first symbolic representation may be created by either the first EDA tool or the second EDA tool in identical or substantially similar manners as those described for the second symbolic representation for the second design data with reference to 202B above.

In those embodiments where the second representation includes a PCB design, the method or system may identify a schematic view including schematic design data or a layout view including layout data of the PCB design, which exists as a symbolic view in, for example, an IC schematic editor or an IC layout tool. In these embodiments illustrated in FIG. 2B, the first EDA tool (e.g., an IC schematic suite or an IC layout suite) may be used to natively manipulate the design data of integrated circuit designs, whereas the printed circuit board designs (implemented by, for example, a PCB design tool) and IC packaging designs (implemented by, for example, IC packaging design tool) may be represented as symbolic views in the first EDA tool session. The second EDA tool (e.g., the PCB design tool) may be used to natively manipulate the PCB design data native to the PCB design tool, whereas an IC packaging designs may be represented as a symbolic view in the PCB design. A third EDA tool (e.g., an IC packaging design tool) may be used to natively manipulate IC packaging design data native to the IC packaging design tool, whereas an IC or die design in the IC packaging design tool session will be represented as a symbolic view in the IC packaging design.

At 210B, the design data for the symbolic views of the one or more third components native to and generated by the first or the third EDA tool may be identified. In some of these embodiments, the design data may be identified from the same design database system or one or more libraries from which the first design data are identified. In some embodiments where the one or more third components include an IC packaging design that is represented as a symbolic view in the second representation of a PCB design, the method or system may identify the schematic design data or the layout data native to the IC packaging design tool at 210B. In some other embodiments where the one or more third components include an IC design that is represented as a symbolic view (e.g., under the IC packaging symbolic representation) in the second representation of a PCB design, the method or system may identify the schematic design data or the layout data native to the IC schematic editor or an IC layout tool at 210B.

At 212B, the method or system may, at the first EDA tool, check or verify the correctness of the first design data or to test the portion of the multi-fabric electronic design corresponding to the first design data in the first EDA tool session. In some of these embodiments, the method or system may utilize the first EDA tool to check or verify the correctness of the design data native to the first EDA tool or to test the portion of the multi-fabric electronic design corresponding to the first design data. In some embodiments, the first EDA tool session may also check or verify the correctness of the interface circuit components between the first design fabric and the second design fabric by, for example, comparing the connectivity information of these interface circuit components in the first design fabric with the corresponding connectivity information in the second design fabric.

For example, the PCB tool session may compare the connectivity information in the PCB design fabric (e.g., the name and destination of a net connected to a symbolic representation of an IC packaging design in the PCB tool session) with the corresponding connectivity information for an IC packaging symbolic representation (e.g., the names of one or more pins that are in the IC packaging design fabric or in the IC packaging symbolic representation and are connected to the net in the PCB design fabric) interconnected to some of the design components in the PCB tool session to ensure that the IC packaging symbolic representation is correctly interconnected as designed in the PCB EDA tool session and/or in the IC packaging design fabric.

In some embodiments, the method or system may also verify the correctness of the second or third components by invoking the respective EDA checking or verification tools and transmitting information including, for example, data or information at or near the interface between the second or third components in the first EDA tool to the respective native EDA tools. For example, the method or system may invoke a PCB design tool to verify the correctness of the PCB design by transmitting data or information including the data or information at or near the interface of the PCB design and a test bench design or an IC packaging design. The PCB design verification tool may then check or verify the correctness of the PCB design by using at least the transmitted data or information in some embodiments. Similarly, the method or system may invoke an IC packaging design verification tool to check or verify the correctness of an IC packaging design by transmitting data or information to the IC packaging design tool including the data or information at or near the interface of the IC packaging design and, for example, the PCB design including the IC packaging design or an IC design included in the IC packaging design. The IC packaging design tool may then check the correctness of the IC packaging design by using at least the transmitted data or information in some embodiments.

At 214B, the method or system may, at the second EDA tool, verify the correctness of the second design data and/or the one or more symbolic views of the first design data native to the first EDA tool by using the corresponding schematic design data or the corresponding layout data of the second design data that are native to the second EDA tool in identical or substantially similar manners as those described above for 212B with one exception that the second EDA tool session is now checking the one or more symbolic representations of the first design data displayed in the second EDA tool session. For example, the method or system may use a PCB design verification tool to verify the correctness of the PCB design, which is represented as a symbolic view in an IC schematic suite or an IC layout suite (e.g., editors, simulators, etc.), by transmitting data or information including the data or information determined by the IC schematic suite or layout suite (e.g., connectivity information, electrical data such as voltages, currents, etc., parasitic information such as resistances, capacitances, etc., or any combinations thereof) at or near the interface between the PCB design and the IC packaging design or the IC design to the PCB design verification tool. In some embodiments, the information or data may be included in or associated with a request for action transmitted to the PCB design verification tool.

The PCB design verification tool may then check or verify the correctness of the PCB design by using at least the transmitted data or information in some embodiments. In these embodiments, the method or system may perform verification across multiple fabrics in a seamless manner while the multi-fabric electronic design is being implemented, without having to separately implement the designs in each fabric and then perform post-design verifications to catch after-the-fact errors or violations. In some of these embodiments, the method or system not only provides a multi-fabric design environment for a design team to collaborate on a multi-fabric electronic design across multiple design fabrics but also enables nearly real-time checking, verification, and/or testing of the correctness of the multi-fabric electronic design across multiple design fabrics.

Figure 2D:
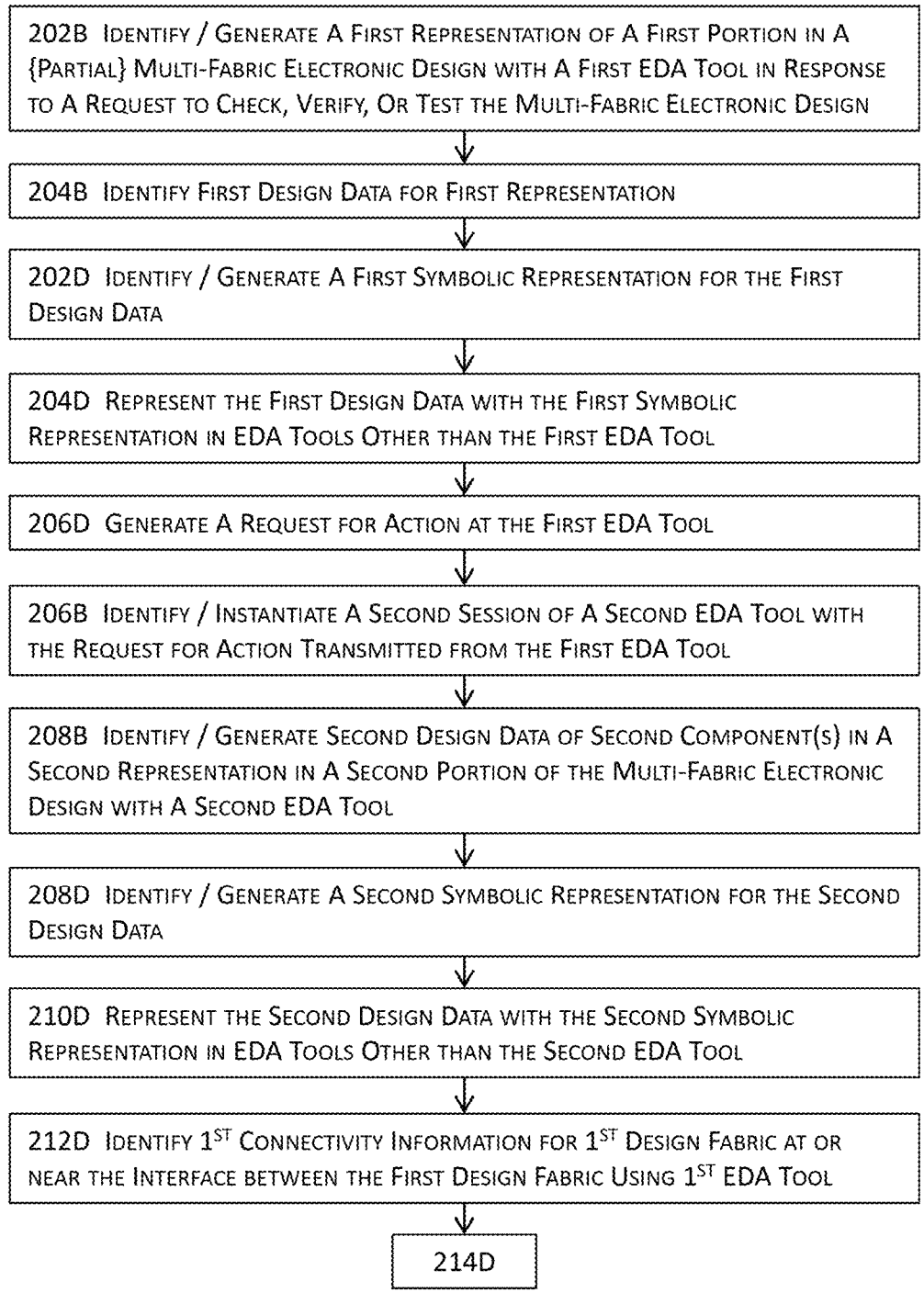
FIGS. 2D-E jointly illustrate another more detailed block diagram of a method or system for checking, verifying, or testing a multi-fabric electronic design across multiple design fabrics in some embodiments.
Figure 2E:
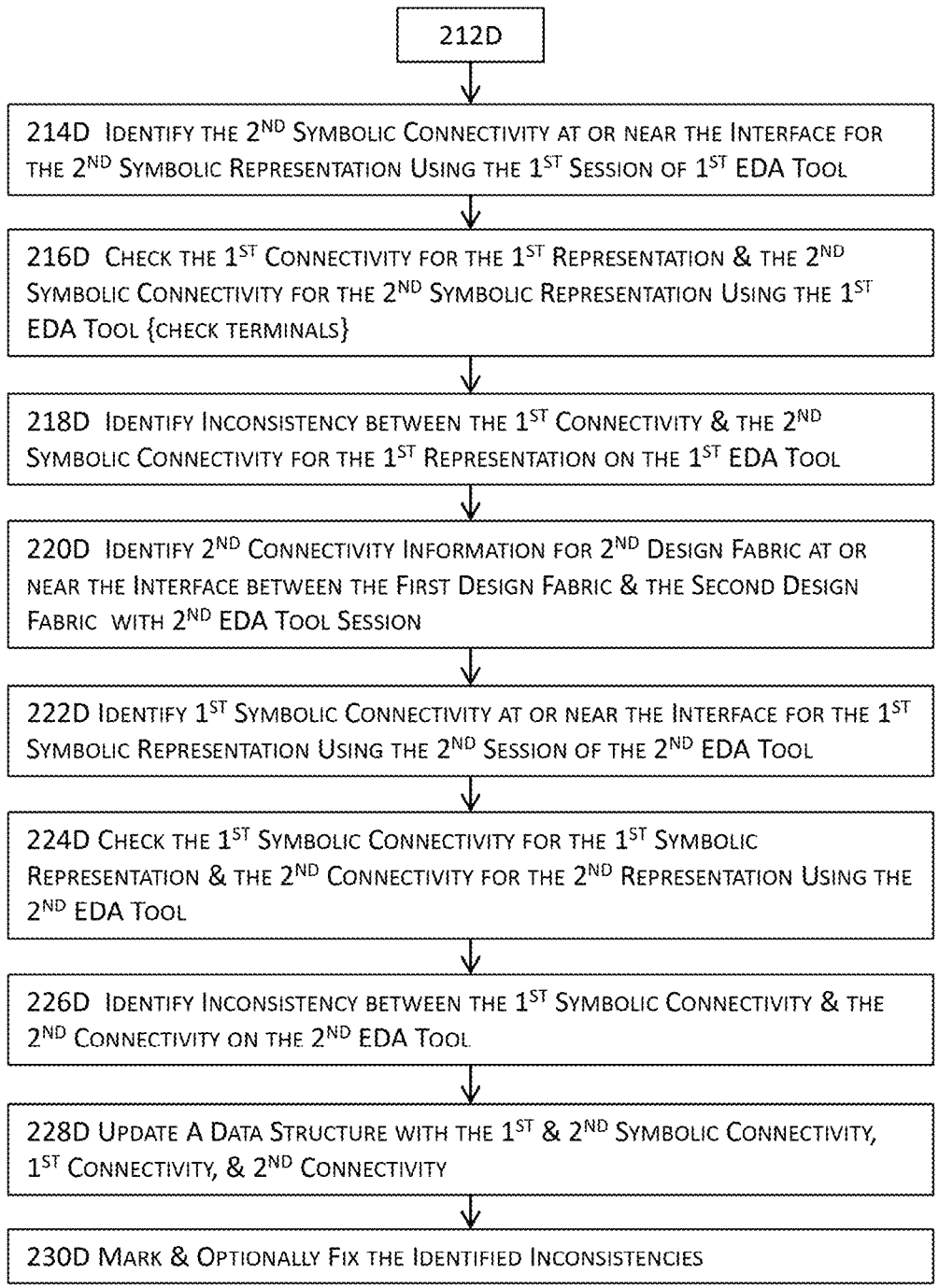

FIGS. 2D-E jointly illustrate another more detailed block diagram for a method or system for checking, verifying, or testing a multi-fabric electronic design across multiple design fabrics in some embodiments. In these embodiments illustrated in FIGS. 2D-E, the method or system may perform the acts of 202B and 204B in identical or substantially similar manners as those described above with reference to FIGS. 2B-C. The method or system may further identify (if already existing) or generate (if non-existing) a first symbolic representation for the first design data at 202D. The first symbolic representation for the first design data may be generated by the first EDA tool to which the first design data are native or by another EDA tool to which the first design data are non-native. Generating a symbolic representation for design data by using an EDA tool to which the design data are native as well as using an EDA tool to which the design data are non-native are described above with reference to FIGS. 2B-C and thus may be used in identical or substantially similar manners at 202D.

A symbolic representation may include, for example, a schematic symbol representing the second design data yet containing only the connectivity information to facilitate the interconnection of the schematic symbol to the corresponding part of the first design data. A symbolic representation for layout data may also include a layout symbolic shape having identical or substantially similar footprint as the actual layout data yet includes only the connectivity information to facilitate the interconnection of the layout symbolic shape to the corresponding part of the layout data. At 204D, the method or system may represent the first design data with the first symbolic representation in one or more EDA tool sessions to which the first design data are non-native. At 206D, the method or system may generate a request for action in the first EDA tool session when or before the first EDA tool session encounters non-native design data or any symbolic representations associated with the non-native design data.

The method or system may then identify (if already existing) or instantiate (if non-existing) a second session of a second EDA tool with the request for action at 206B and identify or generate the second design data of one or more second circuit components in a second representation for a second portion at 208B as identically or similarly described above with reference to FIGS. 2B-C. At 208D, the method or system may identify (if already existing) or generate (if non-existing) a second symbolic representation for the second design data. The second symbolic representation for the second design data may be generated by the second EDA tool to which the second design data are native or by another EDA tool to which the second design data are non-native. Generating a symbolic representation for design data by using an EDA tool to which the design data are native as well as using an EDA tool to which the design data are non-native are described above with reference to FIGS. 2B-C and thus may be used in identical or substantially similar manners at 208D.

At 210D, the method or system may further represent the second design data with the second symbolic representation in one or more EDA tool sessions (e.g., the first EDA tool session) to which the second design data are non-native. The method or system may then identify the first connectivity information for the first design fabric including the first design data at or near the interface between the first design fabric and another design fabric by using the first EDA tool session at 212D. For example, the method or system may identify one or more nets and/or their respective destinations (e.g., pins) for the first design fabric at or near the boundary where the first design data are connected to the second symbolic representation of the second design data as well as the connectivity information associated with the second symbolic representation (e.g., the pins and/or nets connected to the one or more nets and/or their respective destinations in the first design data) and recognizable by the first EDA tool session at 212D.

At 214D, the method or system may further identify the second symbolic connectivity for the second design data at or near the interface of the second symbolic representation by using the first session of the first EDA tool session. For example, the method or system may identify the identifiers of the pins and/or the net segments of the second symbolic representation that are interconnected with the corresponding circuit components in the first design data at 214D. The method or system may then check or verify the first connectivity information identified at 212D against the second symbolic connectivity identified at 214D by using the first EDA tool at 216D. For example, the method or system may compare the identifiers of pins and nets going into the second symbolic representation with the corresponding identifiers of pins and nets associated with the second symbolic representation to determine whether the second symbolic representation is correctly interconnected with the first design data in the first EDA tool session.

In addition to checking or verifying the interface connectivity between detailed design data and symbolic representations, the method or system may also check or verify the detailed design data in the first EDA tool session by using the checker or verification tool to which the detail design data are native. Nonetheless, the checker or verification tool (e.g., a verification tool for verifying IC design data) may not be able to understand or access the detailed design data represented by a symbolic representation. The first EDA tool session may thus use a request for action to identify or instantiate the second EDA tool session, to which the detailed design data for the symbolic representation are native, to continue the verification, checking, or testing for the detailed design data for the symbolic representation.

At 218D, the method or system may further identify any inconsistency that exists between the first connectivity and the second symbolic connectivity for the second symbolic representation using the first EDA tool session. For example, the method or system may utilize the first EDA tool session to identify any missing connectivity (e.g., a pin in the first design data is not found in the symbolic representation), mismatching connectivity (e.g., a pin name in the first design data does not match or is not a recognized variant of the corresponding pin name in the symbolic representation), conflicting connectivity (e.g., a pin direction in the first design data does not match the corresponding pin direction in the symbolic representation), mismatching constraints or characteristics associated with the connectivity (e.g., mismatched terminal power sensitivity, mismatched terminal constraints, etc.), or any other suitable attributes, characteristics, or properties that are needed to ensure the proper performance of the multi-fabric electronic design or any portions thereof.

The acts 220D through 226D illustrate the process of checking the interface connectivity between the first design fabric and the second design fabric on the second EDA tool session, rather than on the first EDA tool session as described in 212D through 218D. These embodiments illustrate that the method and system described herein may initiate the checking, verification, or testing in any EDA tool sessions. For example, a designer may open a PCB design with a PCB design editor and check whether a portion of the PCB design performs correctly as designed by running a set of test vectors. When the set of test vectors reach, for example, a symbolic representation of an IC packaging design in the PCB design, an IC packaging design tool session is automatically identified (if already existing) or instantiated (if non-existing) by a request for action issued from the PCB design tool.

The connectivity at or near the interface between the PCB design and the IC packaging design symbolic representation may be checked or verified to ensure that the IC packaging symbolic representation is correctly connected in the PCB design. The IC packaging verification tool may also be invoked to run the set of test vectors and/or the intermediate output from the PCB design portion to test whether the IC packaging design performs correctly as designed. Another IC design tool session may also be similarly identified or instantiated by another request for action from, for example, the IC packaging design tool, the IC packaging verification tool, the PCB design tool, or the PCB design verification tool. The set of test vectors or intermediate outputs from the PCB design portion or the IC packaging design may be run for the IC design to determine if the corresponding portion of the IC design functions correctly in response to the set of test vectors. If the designer subsequently decides to run another set of test vectors on a portion of the IC design to check the correctness of that portion, the output of the IC design in response to this set of test vectors may be propagated into the IC packaging design.

The IC packaging design verification tool session, which was instantiated or identified in the first testing, may then be identified to receive the output from the IC design and to check whether the IC packaging design reacts in response to the output as designed. The verification flow may further propagate to the PCB design or even to the test bench design, and the method or system adapts and invokes the proper EDA tool sessions to perform the testing, checking, or verification. At 220D, the method or system may optionally identify second connectivity information for the second design fabric at or near the interface between the first design fabric and the second design fabric by using the second EDA tool session in identical or substantially similar manners as the identification of the first connectivity at 212D. The method or system may further identify the first symbolic connectivity for the first symbolic representation of the first design data at or near the interface between the first design fabric and the second design fabric in the second EDA tool session at 222D.

At 224D, the method or system may check the first symbol connectivity for the first symbolic representation identified at 222D and the second connectivity for the second representation identified at 220D by using the second EDA tool session in substantially similar manners as those described for 216D above but with the second EDA tool session with the first symbolic connectivity and the second connectivity. At 228D, the method or system may identify or determine the inconsistency between the first symbolic connectivity and the second connectivity in substantially similar manners by using the second EDA tool session as those described for 218D but with the second EDA tool session, the first symbolic connectivity for the first design data non-native to the second EDA tool, and the second connectivity for the second design data native to the second EDA tool.

At 228D, the method may optionally update one or more data structures with the first connectivity, the second connectivity, the first symbolic connectivity, and/or the second connectivity. In some embodiments, the method or system may mark the inconsistencies identified at 226D and/or 218D. In some of these embodiments, the method or system may further automatically fix the inconsistencies. For example, the method or system may automatically fix missing connectivity by adding a missing pin to a symbolic representation, fix mismatching connectivity by modifying a pin name of a symbolic representation, or invoke other EDA tools to automatically fix errors identified during the testing, checking, or verification of the multi-fabric electronic design.

FIG. 3A further illustrates that the printed circuit board design 304 in the test bench design fabric 302 includes an interconnect 350 to connect a first point within the IC design 314 and a second point within the IC design 312. The interconnect 350 crosses the boundary of the IC design 314 in the IC design fabric, the boundary of the IC packaging design 306 in the IC packaging design fabric into the PCB design fabric, the boundary of IC packaging design 308 in the IC packaging design fabric, and the boundary of the IC design 312 in the IC design fabric. The method or system may thus use various techniques described herein to process or manipulate the multi-fabric electronic design. For example, the method or system may use various techniques to netlist the multi-fabric electronic design for simulation. Once the cross-fabric simulation results are obtained, the method or system may display the simulation results for the interconnect 350 that spans across multiple design fabrics.

For example, the user may identify interconnect 350 by, for example, clicking on any part of the interconnect in any design fabric either in the graphic user interface showing the portion of the multi-fabric electronic design including the part of the interconnect or in an expandable and collapsible, textual tree structure of the multi-fabric electronic design in a hierarchical and/or fabric-specific manner. The user may further optionally specify what level of simulation results is to be retrieved or displayed for which part of the interconnect 350. As another example, the user may specify to see the simulation results for the interconnect segment of the interconnect 350 in only the PCB fabric or only the interconnect segment at the IC packaging design hierarchical level.

If the user does not specify the level of simulation results to be displayed, the method or system may retrieve and display the default level of simulation results. For example, the method or system may retrieve and display only the simulation results in the fabric and at the hierarchical level that correspond to the part of the interconnect being identified by the user in some embodiments. As another example, the method or system may retrieve and display the entire simulation results for the entire interconnect in all of the fabrics and all of the hierarchical levels across which the interconnect spans in some other embodiments. In response to the user's identification of the interconnect 350 and optionally on the user's specification of the level of simulation results, the method or system may identify appropriate connectivity information for the identified interconnect in the desired fabrics and/or at the desired hierarchical level, and use the appropriate connectivity information to retrieve the corresponding simulation results for display in a user interface.

In addition, the simplified representation of electronic design includes the test bench 302 at a first hierarchical level. The test bench 302 may further include a representation (e.g., a symbolic representation) of the printed circuit board 304 at a second hierarchical level. The test bench 302 may also include multiple interconnects from, for example, various power or ground rails to the printed circuit board 304. The printed circuit board 304 may also include a discrete component 320 situated at a third hierarchical level with the two IC packaging. The printed circuit board 304 may include the first IC packaging 306 and the second IC packaging 308 situated at a third hierarchical level, both of which may also be represented in one or more representations (e.g., a symbolic representation or schematic representation).

The first IC packaging 306 may include a IC 314 and a IC 310 that further includes a discrete component 318. The second IC packaging 308 may also include a IC 312 and a IC 316 situated at a fourth hierarchical level as the IC 310 and the IC 314. In some embodiments, one or more integrated circuit design EDA tools (e.g., an IC schematic editor, IC layout tool, etc.) may be used to generate, modify, or otherwise access the design data of the integrated circuit designs 310, 314, 312, and 316, whereas IC packaging design tools or printed circuit board design tools only receive symbolic representations of these integrated circuit designs. In these embodiments, IC packaging design tools may be used to generate, modify, or otherwise access the design data (e.g., schematic design data, physical design data, etc.) of the IC packaging designs 306 and 308, whereas the one or more integrated circuit design EDA tools and the printed circuit board design tools may only receive symbolic representations of the IC packaging 306 and 308.

In these embodiments illustrated in FIG. 3A, the printed circuit board design 304 also includes an interconnect that connects the second IC 314 and the third IC 312 across the boundaries of the first IC packaging 306 and the second IC packaging 308. Moreover, one or more printed circuit board design tools may be used to generate, modify, or otherwise access the design data (e.g., schematic or physical design data) of the printed circuit board, whereas the one or more IC design EDA tools and the IC packaging design tools may only receive a symbolic representation of the printed circuit board design.

The test bench design including the integrated circuit designs, the IC packaging designs, the printed circuit boards, one or more discrete components, and interconnections at the test bench level may be implemented in an integrated circuit design tool (e.g., an IC schematic tool for editing and/or simulating schematic designs of integrated circuit designs or for transmitting to and receiving from the physical designs, etc. or an IC layout tool for implementing or modifying layouts of or analyzing integrated circuit designs) because IC design tools have gone through extensive development and often includes various design environments or tools such as schematic editors, analog design tools, layout tools, RF design tools, various simulators (e.g., general purpose circuit simulation including SPICE or SPICE-like simulators, other digital simulators, other analog simulators, etc.) as well as various libraries. The EDA tools described herein may also be integrated with post-layout tools including, for example, verification and closure tools and may thus provide more functionalities and diverse capabilities than stand-alone printed circuit board design tools or IC packaging design tools.

FIG. 3B illustrates a cluster of computing systems that may be used to implement various techniques and methodologies for a multi-fabric design environment described herein in some embodiments. The multi-fabric design environment may include the test bench fabric, the printed circuit board and packaging fabric, and the die fabric. In some of these embodiments, the multi-fabric design environment may include an IC packaging fabric and a printed circuit board fabric. The multi-fabric design environment may include one or more test bench design databases 308B in the test bench fabric, one or more IC design databases 310B in the die fabric, one or more IC packaging design databases 304B and one or more printed circuit board design data databases 306B in the fabric.

In some embodiments where the multi-fabric design environment includes a printed circuit board fabric and a separate IC packaging fabric, the multi-fabric design environment may include one or more IC packaging design data databases 304B in the IC packaging fabric and one or more PCB design data databases 306B in the PCB fabric. The multi-fabric design environment may further include one or more IC design tools (e.g., 302B) such as an IC schematic suite or an IC layout suite for manipulating the native schematic or physical design data of integrated circuit designs in the die fabric. The multi-fabric design environment may also include one or more PCB design tools (e.g., 312B) for manipulating the native schematic or physical design data of PCB designs in the PCB/IC packaging fabric or in the dedicated PCB fabric. The multi-fabric design environment may also include one or more IC packaging design tools (e.g., 312B) for manipulating the native schematic or physical design data of IC packaging designs in the PCB/IC packaging fabric 316B or in the dedicated IC packaging fabric.

FIG. 3C illustrates a simplified test bench design including various instances to which various techniques and methodologies apply in some embodiments. More specifically, the simplified test bench design may include, at the first hierarchical level, the test bench design 302C including an instance 304C of a printed circuit board on a first EDA tool. The test bench design 302C may be implemented in one or more IC design tool such as an integrated circuit schematic suite or an integrated circuit layout suite to leverage the more complete and advanced editing, simulation, and/or analysis capabilities of such design tools and also to leverage the better integrated verification and/or design closure tools such as various post-layout verification tools. The test bench design 302C may exist in the test bench fabric and includes the symbolic view of the PCB design. When specific design data in the instance 304C of the PCB are inquired into or needed, the first EDA tool may identify or initiate an instance of a second EDA tool that is built to manipulate the native design data of PCB designs.

The second EDA tool may open the pertinent design data or a view 310C including the pertinent design data of the instance 304C of the PCB. The method or system described herein may further establish a correlation or link between the pertinent design data or view 310C of the PCB and the instance 304C of the PCB in the test bench 302C by using, for example a data structure to store the correlation or link. The second EDA tool may thus load the pertinent design data or view 310C that further includes a symbolic view of a first IC packaging design 312C and a symbolic view of a second IC packaging design 314C. The PCB design 310C may thus exist in the PCB fabric including symbolic views of IC packaging designs. When the design data of the IC packaging designs (e.g., 312C or 314C) are needed, the method or system may further identify or instantiate a third EDA tool (e.g., an IC packaging design tool) to load, for example, the pertinent design data or view 316C of IC packaging design 312C.

The third EDA tool may load the pertinent design data or view 316C that further includes a first die design 318C and a second die design 320C. The pertinent design data or view 316C of the IC packaging design 312C may exist in the IC packaging fabric and thus includes only the symbolic views of the die designs 318C and 320C. When the design data (e.g., schematic design data or layout data) of the die design (e.g., the first die design 318C) are needed, the third EDA tool may identify or instantiate the appropriate EDA tool (e.g., the IC schematic tool or IC layout tool) to open the pertinent design data or view (e.g., 306C) for the die design (e.g., 318C). In these embodiments illustrated in FIG. 3C, the pertinent design data or view 306C for the symbolic view 318C of the first die design includes further details of the design (e.g., schematic design of a field effect oxide or FET as shown in 308C) in the IC design fabric.

System Architecture Overview

Figure 4:
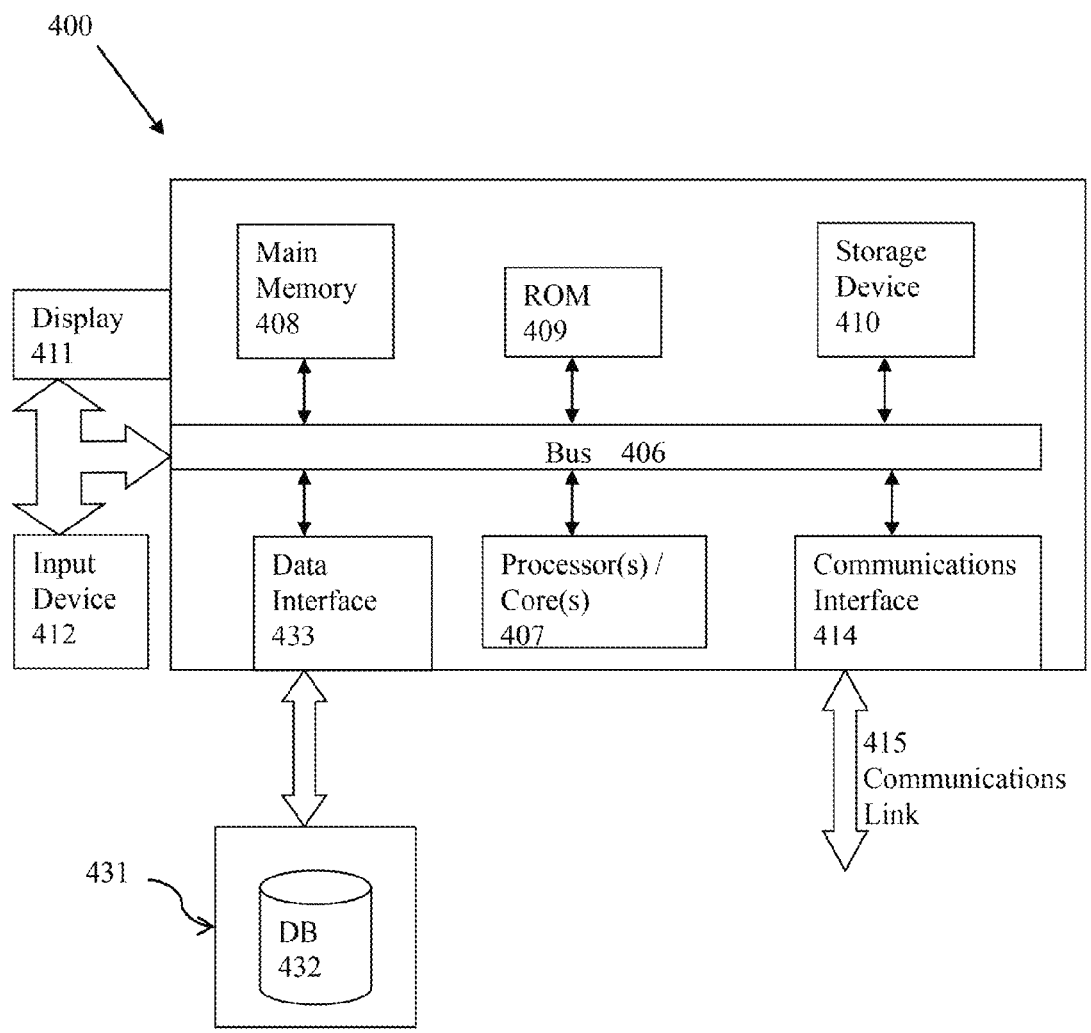
FIG. 4 illustrates a computerized system on which a method for implementing, verifying or checking, and/or analyzing a multi-fabric electronic design across multiple design fabrics may be implemented.

FIG. 4 illustrates a block diagram of a simplified illustration of a computing system 400 suitable for FIG. 4 illustrates a computerized system on which a method for implementing, verifying or checking, and/or analyzing a multi-fabric electronic design across multiple design fabrics as described in the preceding paragraphs with reference to various figures. Computer system 400 includes a bus 406 or other communication mechanism for communicating information, which interconnects subsystems and devices, such as processor 407, system memory 408 (e.g., RAM), static storage device 409 (e.g., ROM), disk drive 410 (e.g., magnetic or optical), communication interface 414 (e.g., modem or Ethernet card), display 411 (e.g., CRT or LCD), input device 412 (e.g., keyboard), and cursor control (not shown).

According to one embodiment, computer system 400 performs specific operations by one or more processor or processor cores 407 executing one or more sequences of one or more instructions contained in system memory 408. Such instructions may be read into system memory 408 from another computer readable/usable storage medium, such as static storage device 409 or disk drive 410. In alternative embodiments, hard-wired circuitry may be used in place of or in combination with software instructions to implement the invention. Thus, embodiments of the invention are not limited to any specific combination of hardware circuitry and/or software. In one embodiment, the term "logic" shall mean any combination of software or hardware that is used to implement all or part of the invention.

Various actions or processes as described in the preceding paragraphs may be performed by using one or more processors, one or more processor cores, or combination thereof 407, where the one or more processors, one or more processor cores, or combination thereof executes one or more threads. For example, the act of specifying various net or terminal sets or the act or module of performing verification, simulation, design checking, netlisting, probing, simulations, analyses, etc. may be performed by one or more processors, one or more processor cores, or combination thereof. In one embodiment, the parasitic extraction, current solving, current density computation and current or current density verification is done in memory as layout objects or nets are created or modified.

The term "computer readable storage medium" or "computer usable storage medium" as used herein refers to any medium that participates in providing instructions to processor 407 for execution. Such a medium may take many forms, including but not limited to, non-volatile media and volatile media. Non-volatile media includes, for example, optical or magnetic disks, such as disk drive 410. Volatile media includes dynamic memory, such as system memory 408. Common forms of computer readable storage media includes, for example, electromechanical disk drives (such as a floppy disk, a flexible disk, or a hard disk), a flash-based, RAM-based (such as SRAM, DRAM, SDRAM, DDR, MRAM, etc.), or any other solid-state drives (SSD), magnetic tape, any other magnetic or magneto-optical medium, CD-ROM, any other optical medium, any other physical medium with patterns of holes, RAM, PROM, EPROM, FLASH-EPROM, any other memory chip or cartridge, or any other medium from which a computer can read.

In an embodiment of the invention, execution of the sequences of instructions to practice the invention is performed by a single computer system 400. According to other embodiments of the invention, two or more computer systems 400 coupled by communication link 415 (e.g., LAN, PTSN, or wireless network) may perform the sequence of instructions required to practice the invention in coordination with one another.

Computer system 400 may transmit and receive messages, data, and instructions, including program, i.e., application code, through communication link 415 and communication interface 414. Received program code may be executed by processor 407 as it is received, and/or stored in disk drive 410, or other non-volatile storage for later execution. In an embodiment, the computer system 400 operates in conjunction with a data storage system 431, e.g., a data storage system 431 that includes a database 432 that is readily accessible by the computer system 400. The computer system 400 communicates with the data storage system 431 through a data interface 433. A data interface 433, which is coupled to the bus 406 (e.g., memory bus, system bus, data bus, etc.), transmits and receives electrical, electromagnetic or optical signals that include data streams representing various types of signal information, e.g., instructions, messages and data. In embodiments of the invention, the functions of the data interface 433 may be performed by the communication interface 414.

In the foregoing specification, the invention has been described with reference to specific embodiments thereof. It will, however, be evident that various modifications and changes may be made thereto without departing from the broader spirit and scope of the invention. For example, the above-described process flows are described with reference to a particular ordering of process actions. However, the ordering of many of the described process actions may be changed without affecting the scope or operation of the invention. The specification and drawings are, accordingly, to be regarded in an illustrative rather than restrictive sense.

We claim:

1. A computer implemented method for checking, verifying, or testing a multi-fabric electronic design in a multi-fabric electronic design environment, comprising:
using at least one processor to perform a process the process comprising:
receiving a request for checking correctness of a multi-fabric electronic design across at least a first design fabric and a second design fabric;
automatically transmitting a request for action related to the request from a first session of a first EDA tool to a second session of a second EDA tool;
identifying second connectivity information for second design data in the second design fabric by using the second session of a second EDA tool in response to the request for action; and
checking the correctness of the multi-fabric electronic design in the first design fabric with the first session of a first electronic design automation (EDA) tool by using at least the second connectivity information.

2. The computer implemented method of claim 1, wherein first design data of the multi-fabric electronic design in the first design fabric are native to the first EDA tool and non-native to the second EDA tool, and the second design data are native to the second EDA tool and non-native to the first EDA tool.

3. The computer implemented method of claim 1, wherein the act of checking the correctness further includes descending or ascending a hierarchy of the multi-fabric electronic design, and the hierarchy includes a first hierarchy for the first design fabric and a second hierarchy for the second design fabric.

4. The computer implemented method of claim 1, further comprising:
determining pertinent information related to the request at or near a boundary between the first design fabric and the second design hierarchy; and
transmitting the request for action and the pertinent information from the first session of the first EDA tool to the second session of the second EDA tool, wherein the pertinent information is included in or accompanied by the request for action.

5. The computer implemented method of claim 1, the act of checking the correctness of the multi-fabric electronic design in the first design fabric comprising:
determining one or more second symbolic representations for the second design data; and
representing the second design data with the one or more second symbolic representations in the first design fabric using the first session of the first EDA tool.

6. The computer implemented method of claim 5, the act of checking the correctness of the multi-fabric electronic design in the first design fabric comprising:
identifying first connectivity information of at least a part of first design data using the first session of the first EDA tool;
identifying second symbolic connectivity information for the one or more second symbolic representations in the first session of the first EDA tool; and
checking the first connectivity information against second symbolic connectivity information or the second connectivity information.

7. The computer implemented method of claim 1, the process further comprising:
checking the correctness of the multi-fabric electronic design in the second design fabric with the second session of the second EDA tool.

8. The computer implemented method of claim 7, the process further comprising:
automatically transmitting a first request for action from the second session of the second EDA tool to the first session of the first EDA tool;
identifying first connectivity information for first design data in the first design fabric by using the first session of the first EDA tool in response to the first request for action; and
checking the correctness of the second design data of the multi-fabric electronic design in the second design fabric with the second session of the second EDA tool.

9. The computer implemented method of claim 8, the process further comprising:
determining one or more first symbolic representations for the first design data; and
representing the first design data with the one or more first symbolic representations in the second design fabric using the second session of the second EDA tool.

10. The computer implemented method of claim 8, the process further comprising:
identifying first symbolic connectivity information for the one or more first symbolic representations in the second session of the second EDA tool; and
checking the second connectivity information against the first symbolic connectivity information or the first connectivity information.

11. The computer implemented method of claim 1, wherein the multi-fabric electronic design includes a partial, incomplete design that includes no design data for at least one design component, or the multi-fabric electronic design does not satisfy one or more design rules or constraints before the request for processing the multi-fabric electronic design is fulfilled.

12. The computer implemented method of claim 1, wherein a first portion including first design data is operatively connected to a second portion including the second design data in the multi-fabric electronic design.

13. The computer implemented method of claim 1, the act of checking the correctness of the multi-fabric design comprising:
identifying inconsistency between a first representation of first design data and a second representation of the second design data;
identifying the inconsistency with one or more markers; and
fixing the inconsistency.

14. The computer implemented method of claim 1, the process further comprising:
applying a test vector to a first portion including first design data of the multi-fabric electronic design by using the first EDA tool; and
identifying a first set of output generated by the first portion of the multi-fabric electronic design in response to the test vector;

correlating the request for action with the first set of output; and determining whether the first portion of the multi-fabric electronic design functions correctly by using at least the first set of output.

15. The computer implemented method of claim 14, the process further comprising:

applying the first set of output generated by the first portion to a second portion including the second design data of the multi-fabric electronic design by using the second EDA tool;

identifying a second set of output generated by the second portion of the multi-fabric electronic design in response to the first set of output; and determining whether the second portion of the multi-fabric electronic design functions correctly by using at least the second set of output.

16. An article of manufacture comprising a non-transitory computer accessible storage medium having stored thereupon a sequence of instructions which, when executed by at least one processor or at least one processor core executing one or more threads, causes the at least one processor or the at least one processor core to perform a process for checking, verifying, or testing a multi-fabric electronic design in a multi-fabric electronic design environment, the process comprising:

receiving a request for checking correctness of a multi-fabric electronic design across at least a first design fabric and a second design fabric;

automatically transmitting a request for action related to the request from a first session of a first EDA tool to a second session of a second EDA tool;

identifying second connectivity information for second design data in the second design fabric by using the second session of a second EDA tool in response to the request for action; and checking the correctness of the multi-fabric electronic design in the first design fabric with the first session of a first electronic design automation (EDA) tool by using at least the second connectivity information.

17. The article of manufacture of claim 16, the process further comprising at least one of:

a first sub-process, comprising:

determining one or more second symbolic representations for the second design data; and representing the second design data with the one or more second symbolic representations in the first design fabric using the first session of the first EDA tool;

identifying first connectivity information of at least a part of first design data using the first session of the first EDA tool;

identifying second symbolic connectivity information for the one or more second symbolic representations in the first session of the first EDA tool; and checking the first connectivity information against second symbolic connectivity information or the second connectivity information; and a second sub-process, comprising:

applying a test vector to a first portion including the first design data of the multi-fabric electronic design by using the first EDA tool; and identifying a first set of output generated by the first portion of the multi-fabric electronic design in response to the test vector;

correlating the request for action with the first set of output; and determining whether the first portion of the multi-fabric electronic design functions correctly by using at least the first set of output.

18. A system for checking, verifying, or testing a multi-fabric electronic design in a multi-fabric design electronic environment, comprising:

non-transitory computer accessible storage medium storing thereupon program code; and at least one processor executing the program code to receive a request for checking correctness of a multi-fabric electronic design across at least a first design fabric and a second design fabric; automatically transmit a request for action related to the request from a first session of a first EDA tool to a second session of a second EDA tool; identify second connectivity information for second design data in the second design fabric by using the second session of a second EDA tool in response to the request for action; and check the correctness of the multi-fabric electronic design in the first design fabric with the first session of a first electronic design automation (EDA) tool by using at least the second connectivity information.

19. The system of claim 18, the at least one processor further executing the program code to determine one or more second symbolic representations for the second design data; represent the second design data with the one or more second symbolic representations in the first design fabric using the first session of the first EDA tool; identify first connectivity information of at least a part of first design data using the first session of the first EDA tool; identify second symbolic connectivity information for the one or more second symbolic representations in the first session of the first EDA tool; and check the first connectivity information against second symbolic connectivity information or the second connectivity information.

20. The system of claim 18, the at least one processor further executing the program code to apply a test vector to a first portion including first design data of the multi-fabric electronic design by using the first EDA tool; identify a first set of output generated by the first portion of the multi-fabric electronic design in response to the test vector; correlate the request for action with the first set of output; and determine whether the first portion of the multi-fabric electronic design functions correctly by using at least the first set of output.

* * * * *